(12) United States Patent
Zhu et al.

(10) Patent No.: US 8,132,020 B2
(45) Date of Patent: Mar. 6, 2012

(54) SYSTEM AND METHOD FOR USER AUTHENTICATION WITH EXPOSED AND HIDDEN KEYS

(76) Inventors: Yunzhou Zhu, Duluth, GA (US); Xuebin Jiang, Duluth, GA (US)

( * ) Notice: Subject to any disclaimer, the term of this patent is extended or adjusted under 35 U.S.C. 154(b) by 1015 days.

(21) Appl. No.: 12/055,761

(22) Filed: Mar. 26, 2008

(65) Prior Publication Data
US 2008/0240447 A1    Oct. 2, 2008

Related U.S. Application Data

(60) Provisional application No. 60/920,071, filed on Mar. 26, 2007.

(51) Int. Cl.
*G06F 21/00* (2006.01)
(52) U.S. Cl. .............. 713/185; 713/151; 726/8; 380/30; 380/279
(58) Field of Classification Search .................. 713/185, 713/151; 726/8; 380/30, 279
See application file for complete search history.

(56) References Cited

U.S. PATENT DOCUMENTS

| | | | | |
|---|---|---|---|---|
| 5,592,553 | A | 1/1997 | Guski et al. ..................... | 380/23 |
| 5,682,475 | A | 10/1997 | Johnson et al. ............... | 713/202 |
| 5,768,373 | A | 6/1998 | Lohstroh et al. .............. | 380/286 |
| 6,353,888 | B1 | 3/2002 | Kakehi et al. ................. | 713/618 |
| 6,539,479 | B1 | 3/2003 | Wu ................................ | 713/151 |
| 6,678,731 | B1 | 1/2004 | Howard et al. ............... | 709/225 |
| 6,732,181 | B2 | 5/2004 | Lim et al. ...................... | 709/229 |
| 6,763,468 | B2 | 7/2004 | Gupta et al. ..................... | 726/2 |
| 6,920,567 | B1 | 7/2005 | Doherty et al. ................ | 726/22 |
| 7,017,181 | B2 | 3/2006 | Spies et al. ...................... | 726/3 |
| 7,065,787 | B2 | 6/2006 | Ganesan et al. ............... | 726/21 |
| 7,103,912 | B2 | 9/2006 | Xia et al. ......................... | 726/8 |
| 2004/0024688 | A1* | 2/2004 | Bi et al. ........................... | 705/37 |

(Continued)

OTHER PUBLICATIONS

Adi Shamir, "How to share a secret", Communications of the ACM, 22(1), pp. 612-613, 1979.

(Continued)

*Primary Examiner* — Jason K. Gee
*Assistant Examiner* — Abiy Getachew
(74) *Attorney, Agent, or Firm* — Morris Manning & Martin LLP; Tim Tingkang Xia, Esq.

(57) ABSTRACT

The present invention relates to a system and method for digitally authenticating users both online and offline. In one embodiment, a hardware token assigned by a trusted token provider to the user is employed to ensure the identity of the user. In the online authentication, the token is adapted for generating an exposed key EK and a hidden key HK based on a noise code NC and a time code TC of the token, a space code SC of a service server, and an owner code OC of the user. A login session is initialized by entering a user identifier at the service server and the generated EK from a computing device. The service server computes an expose key CEK and a hidden key CHK based one an authentication license generated by the token provider. The service server authenticates the user if the CEK is same as the EK, and sends a response message encrypted the CHK to the computing device. Then, the user provides the HK to the computing device to decrypt the encrypted response message so as to access his/her account. In the offline authentication, the token is adapted for generating a license exposed key LEK used to render the encrypted digital content on an offline compliant device. The compliant device authenticates the user if a license exposed key computed by the compliant device based on a content license of which the user bought is same as LEK, so as to render the protected digital content after authentication.

25 Claims, 9 Drawing Sheets

U.S. PATENT DOCUMENTS

2004/0034774 A1* 2/2004 Le Saint ........................ 713/169
2008/0010207 A1* 1/2008 Yanagihara et al. ............ 705/51

OTHER PUBLICATIONS

RSA White Paper: "Leveraging Two-factor Authentication to Provide Secure Access to Corporate Resources from BlackBerry Devices," 2006, RIMB WP 1006.

M. Looi, "Enhanced Authentication Services for Internet Systems Using Mobile Networks," Global Telecommunications Conference, 2001, Globecom '01, IEEE, vol. 6, 3468-3472.

Leslie Lamport, "Password Authentication with Insecure Communication, Communications" Communications of ACM, Nov. 1981, vol. 24, No. 11, pp. 770-772.

* cited by examiner

SYSTEM AND METHOD FOR USER AUTHENTICATION WITH EXPOSED AND HIDDEN KEYS

CROSS-REFERENCE TO RELATED PATENT APPLICATION

This application claims the benefit, pursuant to 35 U.S.C. §119(e), of U.S. provisional patent application Ser. No. 60/920,071, filed Mar. 26, 2007, entitled "SYSTEM AND METHOD FOR USER AUTHENTICATION WITH TIME-SPACE BASED KEYS," by Yunzhou Zhu and Xuebin Jiang, which is incorporated herein by reference in its entirety.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

FIELD OF THE INVENTION

The present invention relates to authenticate users who are consuming digital services. More specifically, the present invention relates to systems and methods for authenticating legitimate users for requesting a service from a service server over Internet, and/or for authenticating an offline authorized user who requests to render the protected digital content on an offline compliant device.

BACKGROUND OF THE INVENTION

One of challenging problems in network applications, especially in Internet services, such as online banking or purchasing, is authentication. Authentication is a process by which a service server or service provider ensures that the parties are who they say they are. Effective authentication is the basis for protecting financial data, business transactions, valuable assets and resources, digital content and confidential information from theft, misuse, and fraud in the digital world.

Single-factor authentication, which commonly utilizes a pair of a user identifier and a password, is one of the most common authentication methods. Because no parties know the password except the user and the service server, the server authenticates the user if the stored user identifier/password pair matches the one provided by the user in login session.

Traditional password authentication is widely considered insecure. Passwords can be discovered through brute force attack by trying every possible code. People create passwords that can be easily remembered, but can also be easily guessed by hackers. Writing passwords down and leaving it in the desk, or storing it to the computer, is just making it easy to get for someone who has physical access to those places. Passwords could also be eavesdropped in communication channel when it is used in remotely login. Blocking the access if the number of login failures hits a predetermined threshold, the service servers are effective to defend against brute force attack. But this technique is also used by attackers in account-lockout attack with a few failed logins to block someone's account.

Actually, the more serious threat for password stealing is Trojan attack. A Trojan is a malicious program that is disguised as or embedded within legitimate software. The Trojan can be installed on a user's computing device if the user visits an infected website or downloads free software. Various Trojan distribution models include email or instant message attachment, piggybacking within a program, Internet worms, web browser exploit, content injection, hacking into a system and affiliate marketing programs. Trojan steals user's password by recording keystrokes, capturing the screen and sending the information obtained to the hacker.

Single password authentication is also vulnerable to phishing attack. Phishing is a type of deception designed to steal victim's personal identity data. Phisher might send millions of fraudulent e-mail messages to lead recipients to counterfeit websites designed to trick victims into divulging identity data such as credit card numbers, account usernames and passwords.

To address the inherent vulnerabilities of single password authentication scheme, various authentication methods were proposed. For example, a variable password method is disclosed in U.S. Pat. No. 5,682,475. In each login session, the user has to compute a new password with a function based on the new parameter value provided by the server. Both the user and the server share the same secret function. Other methods include a one-time password method disclosed in U.S. Pat. No. 5,768,373, a method of one-time password encrypted with a modified Diffie-Hellman key exchange algorithm disclosed in U.S. Pat. No. 6,539,479, and an enterprise single sign-on method disclosed in U.S. Pat. No. 6,763,468.

Additionally, authentication with the factor of the current Base Transceiver Station location used by the cell phone is reported by Looi (M. Looi, Enhanced Authentication Services for Internet Systems Using Mobile Networks, Global Telecommunications Conference, 2001, GLOBECOM '01, IEEE, vol. 6, 3468-3472.) A two-factor authentication system that requires that the user enters something they know their PINs and something they have the constantly changing token codes on their BlackBerry devices to gain access to the protected applications (RSA White Paper: Leveraging Two-factor Authentication to Provide Secure Access to Corporate Resources from BlackBerry Devices, 2006, RIMB WP 1006).

One-time password authentication methods are effective to prevent against Trojan attack. However one-time password authentication methods, even with multi-factor authentication schemes, are vulnerable to man-in-the-middle (MITM) attack, A phishing attack against Citibank using MITM tactics was reported to defeat a two-factor authentication and gain access to online banking accounts.

The MITM attack is an attack in which an attacker is able to read, insert and modify at will, messages between two parties without either party knowing that the link between them has been compromised. For example, the attacker first sends a phishing email to lead a victim to access attacker's website, and that website looks like the victim's banking website. The victim enters his ID, one-time password into the fake web page to login. The attacker enters the same ID and password received from the victim into the login page of the real bank website. The bank might call the victim to confirm the possession of the cell phone of the logger if two-factor authentication is applied. The victim responds confirmation that leads the attacker being authenticated.

The MITM attack is one of the most difficult attacks to defend. Capturing the password, the fingerprint or retina of the user, or the data encrypted with the most secure algorithm, the hacker between the user and the service server can impersonate the user by relaying the unknown message to meet the server's authentication measures.

Additionally, offline user authentication for rendering the protected digital content is more challenge than online user authentication because (i) the rendering devices, used by an offline user, are not connected with the Internet, or networks, so that no other party, such as a trusted central database to store the user's access key, can be used to ensure the identity of the user. The rendering device, the rendering program, or at least few components of them must be trusted; (ii) there is no effective way to prevent unauthorized users from trying all possible access keys to render an unauthorized digital content on an offline rendering device; and (iii) the offline users may transfer or publish their access keys associated with a piece of digital content, such as a DVD movie or an editing program, to unauthorized parties without losing anything. In contrast, the online users never give the access keys of their banking accounts to others.

Generally, there are four parties in the digital content distribution world: the content publishers, the device manufacturers, the license issuers and the consumers.

In a typical business model, the content publishers and the device manufacturers set up a consortium with the aim of certifying the compliant devices and delegating the right to produce these devices to the participating manufacturers. The content publishers joining the consortium package the digital content so that the content can only be rendered by the compliant devices that enforce the content publisher's copyrights. On the other hand, the device manufacturers joining the consortium only produce the compliant devices based on the security rules set by the publishers. To guarantee the copyright protection, the digital content is encrypted as the protected digital content by the publisher joining the consortium with a secret key. Accordingly, only those device manufacturers who join the consortium can obtain the secret keys, or the hardware module that contains the secret keys. The compliant devices must incorporate such a tamper-proof hardware module with the stored keys and decryption steps in order to prevent malicious users from extracting these keys and build circumvention devices.

To authenticate a user, the license issuers delegating the publishers usually issue a digital license and a password to a user. The compliant device rejects the request of rendering the protected content if the password provided the user could not be verified based on the digital license stored in the device.

Various systems have been developed to prevent unauthorized rendering of the digital content. For example, SafeNet and Aladdin Knowledge Systems offer USB hardware tokens for the software delivered. U.S. Pat. No. 6,920,567 uses the license that binds the digital content to the device, but does not bind the digital content to the user. U.S. Pat. No. 6,353,888 utilizes tamper-proof hardware components in the device and the user identifier to bind the digital content to both the device and the user. U.S. Pat. No. 7,065,787 employs a digital license to bind the digital content to a user.

While these systems have enjoyed various levels of success in reducing unauthorized rendering of the digital content, they often impose a significant burden on the authorized users or are easily defeated by unauthorized users.

Therefore, a heretofore unaddressed need exists in the art to address the aforementioned deficiencies and inadequacies.

SUMMARY OF THE INVENTION

In one aspect, the present invention relates to a method for digitally authenticating a user over a network system having at least one service server, at least one client device and a token provider communicable with one another through the internet. The user has an account established with an account identifier (UserID) in the at least one service server, a hardware token assigned by the token provider, and an owner code (OC) known only by the user and the token provider. The at least one service server has a uniquely global identifier (SC) and an authentication license (AL) associated with the identification information of the at least one service server, the hardware token and the user, where the AL is provided by the token provider and stored in the at least one service server. The SC and the OC are stored in a database of the token provider, and the hardware token is communicable with the at least one client device and the database of the token provider.

In one embodiment, the method includes the steps of entering the SC and the OC into the token by the user, and generating a first exposed key (EK) and a first hidden key (HK) by the token, where each of the EK and the HK is associated with at least the SC and the OC, and a time code (TC) and a noise code (NC) of the token, where the TC is the current time of the token when the EK and the HK are generated, the NC is the built-in secret string of the token. The method also includes the step of initializing a user login session of the at least one service server from the at least one client device by the user to enter the UserID and the generated EK thereinto, where the UserID and the generated EK are transmitted to the at least one service server through the internet. The method further includes the steps of computing a second exposed key (CEK) and a second hidden key (CHK) by the at least one service server based on the AL provided by the token provider, authenticating the user by at the at least one service server when the CEK is same as the EK, sending a response message to the at least one client device by the at least one service server, where the response message is encrypted with the CHK, and decrypting the response message received from the at least one service server at the at least one client device by the HK.

In one embodiment, the hardware token comprises at least a tamper-proof and irreversible time clock with a value of a time code (TC) for generating dynamic keys in any second, a stored tamper-proof and non-volatile noise code (NC) for securing hashed data, a stored tamper-proof and non-volatile license noise code (LNC), means for receiving and displaying the space code (SC) of the at least one service server, means for receiving the owner code (OC) of the user to be authenticated, means for generating the first exposed key (EK), means for generating the first hidden key (HK), means for computing a license exposed key (LEK), means for transmitting the HK or LEK to a selected device wirelessly or non-wirelessly, and means for storing an OC history list OCHL of a predefined number of the distinct received OCs ordered by their occurring frequencies so that the key computing time is increased exponentially with the order index of the newly received OC.

In one embodiment, the step of generating the first exposed key (EK) by the token comprises the steps of computing a first account-lockout-proof key (AK) by hashing a combination of the NC of the token and the SC of the at least one service server using a first hash function H1, computing a first verifier key (VK) by hashing a combination of the NC, the SC and the OC using a second hash function H2, computing a timed account-lockout-proof key (TAK) by hashing a combination of the TC and the AK using a third hash function H3, computing a timed verifier key (TVK) by hashing a combination of the TC and the VK using a fourth hash function H4, and generating the first exposed key EK by concatenating the TAK and the TVK.

In one embodiment, the first hidden key (HK) is regenerated by the token by hashing a combinations of the AK, the VK and the TC using a fifth hash function H5 at the time when the EK is generated in the token, and the second hidden key (CHK) is computed by the at least one service server by hashing a combinations of the AK, the VK and the ST with the fifth hash function H5, after the ST is found. The authentication license (AL) is generated by the token provider by computing a second account-lockout-proof key (CAK) by hashing a combination of the NC of the token and the SC of the at least one service server using the first hash function H1, computing a second verifier key (CVK) by hashing a combination of the NC, the SC and the OC using the second hash function H2, and generating the AL by grouping the CAK and the CVK, where the NC of the token, the SC of the at least one service server and the OC of the user are stored in the database of the token provider.

The step of authenticating the user by at the at least one service server comprises the steps of finding a synchronous time ST within the range of (CT−p, CT+p), where the CT is the current time of the at least one service server, and p is a time tolerance, such that the value of hashing a combination of the ST and the CAK of the authentication license (AL) using the third hashing function H3 is same as the TAK contained in the received EK, authenticating the user by sending the encrypted response message with CHK to the at least one client device if (1) the ST exists in the range of (CT−p, CT+p) and (2) the value of hashing a combination of the ST and the CVK of the authentication license (AL) using the fourth hash function H4 is same as the TVK contained in the received EK, and storing the ST as a new used timestamp (UT) in the at least one service server if the user is authenticated.

The step of decrypting the response message received from the at least one service server at the at least one client device by the HK includes the steps of transmitting the HK from the token to the at least one client device wirelessly or non-wirelessly, decrypting the received response message by the HK with an algorithm that is utilized to encrypt the response message by the CHK at the at least one service server, and rendering the decrypted response message on the at least one client device.

Additionally, the method also includes the step of rejecting the user if the ST is out of the range of (CT−p, CT+p), or if the ST is in the range of (CT−p, CT+p) and the value of hashing the combination of the ST and the CVK of the authentication license (AL) using the fourth hash function H4 is different from the TVK contained in the received EK, or if the found synchronous time ST is less than or same as the stored used timestamp UT, thereby ensuring each EK being used for authentication only once.

Furthermore, the method includes the step of verifying an account-lockout-proof key segment of the EK on the at least one service server during the login session so as to prevent account lockout attacks, where the verifying step comprises the steps of setting a failure number (FN) as 0 for the account if the user is authenticated, blocking the account if the failure number FN of the account exceeds a pre-defined number, and increasing the FN by 1 only if the a value of hashing a combination of the ST and the CAK of the authentication license (AL) using the third hashing function H3 is same as the TAK contained in the received EK, while the value of hashing a combination of the ST and the CVK of the authentication license (AL) using the fourth hash function H4 is different from the TVK contained in the received EK.

Moreover, the method includes the step of authenticating the user by the at least one service server over the internet with a hardware token owned by a delegate of the user. The step in one embodiment comprises the steps of registering a delegate identifier (DelegateID) of the delegate at the token provider by the user to the user's account with confirmation of the delegate, wherein the delegate has a hardware token assigned by the token provider, sending a new authentication license associated with the user to the at least one service server by the token provider, wherein the new authentication license includes an additional mixture user-delegate authentication sub-license (ASL), and authenticating the user with the hardware token of the user's delegate, and the authentication sub-license ASL. In one embodiment, the mixture user-delegate authentication sub-license ASL for the user is generated by the at least service server with the steps of computing an account-lockout-proof key (AK) by hashing a combination of the NC of the token of the delegate and the SC, using the first hash function H1, computing a verifier key (VK) by hashing a combination of the NC of the token of the delegate, the SC and the OC of the user using the second hash function H2, and generating the mixture user-delegate authentication sub-license ASL by grouping AK and VK.

In one embodiment, the step of authenticating the user with the hardware token of the delegate comprises the steps of providing the delegate identifier (DelegateID) by the user during the login session, providing the EK and the HK by the user with the hardware token of the delegate using the user's owner code OC and the space code SC of the at least one service server, authenticating the user by the at least one service server if the exposed key, hashed on the found ST and the information included in the mixture user-delegate authentication sub-license ASL with H3 and H4, matches the received EK, and using the UK, hashed on the found ST and the information included in the authentication sub-license ASL with H5, to encrypt and decrypt and a response message at the at least one service server and a browser of the at least one client device, respectively.

In another aspect, the present invention relates to software stored on a computer readable medium for causing a network system to perform functions to authenticate a user over the network system. The network system has at least one service server, at least one client device and a token provider communicable with one another through the internet. The user has an account established with an account identifier (UserID) in the at least one service server, a hardware token assigned by the token provider, and an owner code (OC) known only by the user and the token provider. The at least one service server has a uniquely global identifier (SC) and an authentication license (AL) associated with the identification information of the at least one service server, the hardware token and the user. The AL is provided by the token provider and stored in the at least one service server. The SC and the OC are stored in a database of the token provider, and where the hardware token is communicable with the at least one client device and the database of the token provider.

In one embodiment, the functions comprises entering the SC and the OC into the token by the user, generating a first exposed key (EK) and a first hidden key (HK) by the token, wherein each of the EK and the HK is associated with at least the SC and the OC, and a time code (TC) and a noise code (NC) of the token, where the TC is the current time of the token when the EK and the HK are generated and the NC is a built-in secret string of the token, initializing a user login session of the at least one service server from the at least one client device by the user to enter the UserID and the generated EK thereinto, wherein the UserID and the generated EK are transmitted to the at least one service server through the internet, computing a second exposed key (CEK) and a second hidden key (CHK) by the at least one service server based on the AL provided by the token provider, authenticating the user by at the at least one service server when the CEK is same as the EK, sending a response message to the at least one client device by at the at least one service server, wherein the response message is encrypted with the CHK, and decrypting the response message received from the at least one service server at the at least one client device by the HK.

In yet another aspect, the present invention relates to a method for authenticating a user to render a piece of protected digital content stored in a compliant device in an offline system with a content publisher, a compliant device, a service server and a token provider. The compliant device has a core content token (CCT) installed therein, and the service server has a uniquely global identifier (SC) and are adapted for providing a content license (CL) of the piece of protected digital content. The user has an account established with an account identifier (UserID) in the service server, a hardware token assigned by the token provider, and an owner code (OC) known only by the user and the token provider. The SC and the OC are stored in a database of the token provider.

In one embodiment, the method includes the steps of generating two pairs of RSA public and private keys (PU_FOR_PUBLISHER, PR_FOR_PUBLISHER) and (PU_FOR_TOKEN, PR_FOR_TOKEN) by a consortium joined by the content publisher, the compliant device manufacture, and the token provider such that the token provider is assigned the public key PU_FOR_TOKEN, the content publishers are assigned with the same public key PU_FOR_PUBLISHER; and the private keys PR_FOR_PUBLISHER and PR_FOR_TOKEN are stored in the core content token installed in the compliant device.

The method also includes the steps of packaging the digital content as a piece of the protected digital content by the content publisher, requesting the content license (CL) of the protected digital content by the user from the service server, providing a license exposed key (LEK) by the user with the hardware token to the compliant device, and authenticating the offline user by the compliant device for rendering the protected digital content based on the received LEK and the content license CL.

In one embodiment, the step of packaging the digital content by the publisher comprises the steps of generating a globally unique identifier CONTENT_ID for each piece of digital content, encrypting the digital content by a symmetric encryption algorithm based on a random encryption key CONTENT_KEY to form a protected digital content PROTECTED_CONTENT, and distributing freely the protected digital content PROTECTED_CONTENT.

In one embodiment, the step of requesting the content license (CL) of the protected digital content by the user from the service server comprises the steps of logging in the service server by the user with the user identifier UserID and the generated EK, providing the desired CONTENT_ID and the required digital right by the user to the service server, sending the collected data and request from the service server to the token provider, generating a random dynamic license key DLK, with the same length of LNC of the user by the token provider, computing a supplement license key SLK, by applying exclusive OR operation on the DLK and the LNC, by the token provider so that LNC is revealable by using exclusive OR on the DLK and the SLK, sending the CONTENT_ID, the DLK, and the digital rights information from the token provider to a corresponding digital content publisher, generating a random dynamic content key DCK, with the same length of CONTENT_KEY, by the digital content publisher, computing a supplement content key SCK, by applying exclusive OR operation on the DCK and the CONTENT_KEY, by the digital content publisher so that CONTENT_KEY is revealable by using exclusive OR on the DCK and the SCK, encrypting the CONTENT_ID, the SCK, the DLK and the digital rights information by the digital content publisher with public key PU_FOR_PUBLISHER to form the LICENSE_BODY, sending the LICENSE_BODY and the DCK from the digital content publisher to the token provider, encrypting the CONTENT_ID, the SLK and the DCK by the token provider with public key PU_FOR_TOKEN to form the LICENSE_HEADER, packaging the LICENSE_HEADER and the LICENSE_BODY received from the token provider by the service server to form the content license, and sending the content license from the service server to the user.

The step of providing the license exposed key LEK by the user with the hardware token comprises the step of generating the license exposed key by the hardware token with a sixth hash function H6 on a combination of the license noise code LNC and the time code TC of the hardware token.

In one embodiment, the core content token (CCT) installed in the compliant device comprises a tamper-proof and irreversible time clock having a device time code DTC, means for storing tamper-proof and non-volatile private keys PR_FOR_TOKEN, PR_FOR_PUBLISHER, means for receiving the infrared light signals of the license exposed key LEK provided by the said user, means for computing CONTENT_ID, CONTENT_KEY and LNC by decrypting the content license, means for computing LEK based on LNC and a synchronous time ST, and means for decrypting PROTECTED_CONTENT with key CONTENT_KEY;

The CONTENT_KEY and the LNC, in one embodiment, are computed by the core content token CCT installed the compliant device by the steps of decrypting the LICENSE_HEADER with the stored key PR_FOR_TOKEN by the core content token CCT to get the CONTENT_ID, the SLK and the DCK, decrypting the LICENSE_BODY with the stored key PR_FOR_PUBLISHER by the core content token CCT to get the CONTENT_ID, the SCK and the DLK, rejecting the rendering request by the compliant device if the CONTENT_ID decrypted from the LICENSE_HEADER is substantially different from the CONTENT_ID decrypted from the LICENSE_BODY, performing exclusive OR on DCK and SCK by the core content token CCT installed in the compliant device to form the CONTENT_KEY of the content, and performing exclusive OR on the DLK and the SLK by the core content token CCT installed in the compliant device to form the LNC of the hardware token owned by the user.

In on embodiment, the step of authenticating the offline user by the compliant device for rendering the digital content comprises the steps of installing the content license into the compliant device by the user, requesting the compliant device by the user to rendering the installed the protected digital content, verifying the CONTENT_D by the core content token CCT installed in the compliant device based on the installed content license, providing the LEK by the user to the compliant device without entering the owner code OC and the space code SC into the hardware token, finding a synchronous time ST within the range of (CT−q, CT+q), wherein the CT is the current time at the core content token CCT installed in the compliant device, and q is a time tolerance, such that a value of hashing a combination of the LNC and the ST, using the sixth hash function H6, is same as the received LEK, using a used timestamp UT to remove the possible multiple authentications for one LEK, authenticating the user if the value of hashing a combination of the LNC and the ST using the sixth hash function H6 is same as the received LEK, decrypting the PROTECTED_CONTENT by the core content token CCT installed in the compliant device with the CONTENT_KEY, and rendering the decrypted digital content by the compliant device. The step of authenticating the offline user by the compliant device for rendering the digital content further comprises the step of rejecting the rendering request if the value of hashing a combination of the LNC and the ST using the sixth hash function H6 is different from the received LEK.

In a further aspect, the present invention relates to software stored on a computer readable medium for causing an offline system to perform functions to authenticate a user to render a piece of protected digital content stored in a compliant device in the offline system with a content publisher, a compliant device, a service server and a token provider, wherein the compliant device has a core content token CCT installed therein. The service server has a uniquely global identifier (SC) and are adapted for providing a content license (CL) of the piece of protected digital content. The user has an account established with an account identifier (UserID) in the service server, a hardware token assigned by the token provider, and an owner code (OC) known only by the user and the token provider. The SC and the OC are stored in a database of the token provider.

In one embodiment, the functions includes generating two pairs of RSA public and private keys (PU_FOR_PUBLISHER, PR_FOR_PUBLISHER) and (PU_FOR_TOKEN, PR_FOR_TOKEN) by a consortium joined by the content publisher, the compliant device manufacture, and the token provider such that the token provider is assigned the public key PU_FOR_TOKEN, the content publishers is assigned with the same public key PU_FOR_PUBLISHER, and private keys PR_FOR_PUBLISHER and PR_FOR_TOKEN are stored in the core content token CCT installed in the compliant device.

The functions further includes packaging the digital content as a piece of the protected digital content by the content publisher, requesting the content license (CL) of the protected digital content by the user from the service server, providing a license exposed key (LEK) by the user with the hardware token to the compliant device, and authenticating the offline user by the compliant device for rendering the protected digital content based on the received LEK and the content license.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings, which are not necessarily drawn to scale, illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
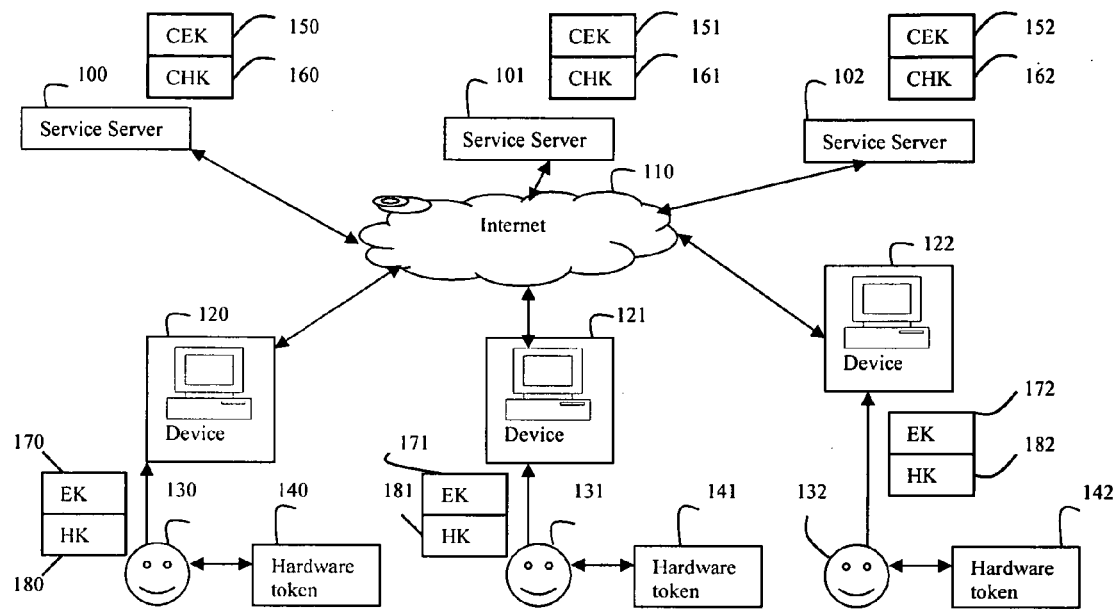
FIG. 1 shows schematically an authentication system with exposed and hidden keys over Internet according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings of FIGS. 1-10, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Additionally, some terms used in this specification are more specifically defined below.

The terms used in this specification generally have their ordinary meanings in the art, within the context of the invention, and in the specific context where each term is used.

Certain terms that are used to describe the invention are discussed below, or elsewhere in the specification, to provide additional guidance to the practitioner in describing the apparatus and methods of the invention and how to make and use them. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the invention or of any exemplified term. Likewise, the invention is not limited to various embodiments given in this specification. Furthermore, subtitles may be used to help a reader of the specification to read through the specification, which the usage of subtitles, however, has no influence on the scope of the invention.

As used herein, "about" or "approximately" shall generally mean within 20 percent, preferably within 10 percent, and more preferably within 5 percent of a given value or range. Numerical quantities given herein are approximate, meaning that the term "about" or "approximately" can be inferred if not expressly stated.

OVERVIEW OF THE INVENTION

In one aspect, the present invention relates to a system and method that utilize an exposed key and a hidden key both generated by a hardware token to ensure the identity of the user for a service server. The hardware token is assigned to the user by a token provider. The service server has an authentication license associated with the user pre-generated by and provided from the token provider. In a login session, a user identifier and an associated exposed key are required with a browser of a computing device over Internet. The exposed key is generated by the hardware token with hashing functions. The user is authenticated if an exposed key computed by the service server based on the authentication license is same as the received exposed key. After authentication, the service server computes a hidden key based on the authentication license, and then sends a response message encrypted by the hidden key. The user must provide the hidden key generated by the hardware token to the browser of the computing device to decrypt the response messages.

Prior to the authentication, the hardware token is issued to the user by the token provider so that a built-in noise code (NC) of the hardware token and an owner code (OC) entered by the user to the hardware token are stored in the database of the token provider. Additionally, an authentication license is generated by the token provider and issued to the service server.

In the login session, the user has to provide a user identifier of his/her account and an associated exposed key (EK) for logging into the service server from a browser of the computing device over Internet. The exposed key is generated by the hardware token hashing on at least four factors:

(i). a time code (TC)—the time instance of the built-in clock in the hardware token. The TC relates the time information about "when you login";

(ii). a public space code (SC)—a globally unique identifier of the service server. The SC indicates the space information about "where you want to login";

(iii). a noise code (NC)—a long unique string built in the hardware token. The NC shows "what you have"; and (iv). a secret owner code (OC)—a short easier remembered string entered by the user to the hardware token when the user wants to generate the exposed key.

The OC proves "what you know".

The user is authenticated if an exposed key computed by the service server based on an authentication license provided by the token provider with the NC, SC and OC associated with that user is same as the received one.

In one embodiment, the user provides an additional hidden key, differently hashed on the same NC, TC, SC and OC, to the browser without transmitting it over Internet. After authenticating the user, the service server sends a response encrypted by the same hidden key computed from the authentication license back to the user. The browser then decrypts and renders the response with the hidden key.

Note that the service server verifies the exposed key instance only once in the non-expiring duration of the keys to prevent the keys from being stolen. Only one hardware token is needed for a user for all his/her accounts at the different service servers.

In one embodiment, when the hardware token is not available, a user is able to use his/her friend's hardware token to login his/her account at a service server with the user's OC and service's SC. In this case, the user has to specify his/her friend as his/her delegate at the token provider's server, and the corresponding authentication license must be assigned to the service server.

Notably, the hidden key is not transmitted between the user and the service server. This approach inherently protects MITM attacks. Furthermore, both the exposed key and hidden key are time related hashing values, and each instance of the key can be used only once. This one-time property prevents Trojan attacks.

In another aspect, the present invention relates to software stored on a computer readable medium for causing a network system to perform functions to authenticate a user over the network system according to the above method.

Yet another aspect of the present invention provides a method and system that employ a license exposed key and a content license to authenticate an offline user for rendering a protected digital content on a compliant device. In one embodiment, the license exposed key is generated by the hardware token based on only the information built in the hardware token without entering any data by the user for convenient usage purpose. In one embodiment, the content license, including both content encryption information and the license exposed key, is created by a process involved with the content publisher, the token provider. The compliant device authenticates the user if the correct content license and the license exposed key are presented. Because the license exposed key can be used only once, the user cannot share his/her license exposed key with others The license exposed key is used to authenticate an offline user on an offline compliant device. The compliant device, such as DVD player, authenticates the user if it is able to compute the same license exposed key, based on a digital content license bought by the user, as the one provided. Because the content license also contains the decryption key of the digit content, the compliant device can render the digit content after authentication.

The license exposed key may be generated by hashing on the time code TC and the license noise code LNC of the hardware token without involving SC and OC. In this case, the user needs only clicking one button to send LEK, with infrared light signals or Bluetooth, to the compliant device.

The exposed key and the license exposed key are actually the dynamic personal ID for the hardware token owner. They may be used for users in logging in service, voting system, credit card authenticating, email/telephone spam preventing, digital signing or even digital currency distributing.

In a further aspect, the present invention relates to software stored on a computer readable medium for causing an offline system to perform functions to authenticate a user to render a piece of protected digital content stored in a compliant device in the offline system according to the above method.

These and other aspects of the present invention are more specifically described below.

IMPLEMENTATIONS AND EXAMPLES OF THE INVENTION

Without intent to limit the scope of the invention, exemplary embodiments of the invention now will be described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete, and will fully convey the scope of the invention to those skilled in the art. Like numbers refer to like elements throughout.

Accordingly, blocks of the diagrams and flowchart illustrations may support combinations of means for performing the specified functions, combinations of elements or steps for performing the specified functions and program instruction means for performing the specified functions. It will be understood that each block of the diagram and flowchart illustrations, and combinations of blocks in the diagrams and flowchart illustrations, can be implemented by special purpose hardware-based computer systems that perform the specified functions, elements or step, or combinations of special purpose hardware and computer instructions. The flowchart may be implemented the illustrated steps in different order.

Note that titles or subtitles may be used in the examples for convenience of a reader, which in no way should limit the scope of the invention. Moreover, certain theories are proposed and disclosed herein; however, in no way they, whether they are right or wrong, should limit the scope of the invention so long as the invention is practiced according to the invention without regard for any particular theory or scheme of action.

A. Authenticating Users with Exposed and Hidden Keys Over Internet

FIG. 1 illustrates schematically an exemplary network environment/system in which the authentication system with an exposed key and a hidden key are utilized. The network system includes at least one online service servers, e.g., 100, 101 and 102, and at least one computing/client device, e.g., 120, 121 and 122, which are communicable with the service servers 100, 101 and 102 over the internet. Each of the computing devices 120, 121 and 122 can be a personal computer, laptop computer, network PC, workstation, minicomputer, mainframe computer, cell phone, hand-held device, any browser based consumer electronics, or the like. The computing/client device 120, 121 or 122 is used by a user 130, 131 or 132 to access one online service server 100, 101 or 102.

Each user 130, 131 or 132 has a unique hardware token 140 assigned by a trust hardware token provider, and an owner code (OC) known only by the user and the token provider. Additionally, each user 130, 131 or 132 has an account established with a unique account identifier (UserID) in one service server 100, 101 or 102.

Each hardware token 140, 141 or 142 has a unique binary string, called noise code (NC), which is used to generate unique exposed and hidden keys. The NC of a hardware token can be used as the identifier of the hardware token. Each service server 100, 101 or 102 has a uniquely global identifier (SC). Additionally, an authentication license (AL) associated with the identification information of the service server, the hardware token and the user is pre-generated by the token provider and provided to and stored in the service server. The SC of the service server and the OC of the user are stored in a database of the token provider. The hardware token is communicable with a computing/client device from which the user access to the service server through wired or wireless protocols.

In practice, the user 130 enters the space code (SC) of a service server, for example, the service server 100, where the user 130 has an account established, and his/her owner code (OC) into the hardware token 140. The SC is the globally unique identifier of the service server 100. The SC can be the Uniform Resource Locator (URL) of the service server 100, say www.bacnkofabcd.com, or the like. The OC is the password of the user 130 for performing key generation on the hardware token 140. Only the user 130 and the token provider know the OC of the user 130. Each user may have different OCs for his/her hardware token.

The hardware token 140 may generate two keys, an exposed key EK 170 and a hidden key HK 180 responsive to the received SC and OC data. The key generation may be triggered by pushing a key generating button on the hardware token 140.

Then, the user 130 enters his/her user identifier (UserID) for his/her account on the service server 100, and the generated EK 170 on a login web page of the service server 100 from the computing device 120 so as to initialize a login session. The identifier (UserID) of the user 130 and the EK 170 are submitted to the service server 100 over Internet.

At the service server side, the service server 100 searches the local database based on the identifier (UserID) of the user 130 to get an authentication license AL associated with the UserID. This authentication license AL is a piece of information generated and assigned by the token provider. The authentication license AL includes the encrypted SC of the service server 100 and the OC of the user 130. Once the authentication license AL is found, the service server 100 computes an exposed key CEK 150 from the authentication license AL. If the CEK 150 is same as the EK 170, the service server 100 authenticates the user 130 to access his/her account. Otherwise, the service server 100 rejects the user 130.

Furthermore, the service server 100 calculates a hidden key CHK 160 from the searched authentication license AL. The CHK 160 is used as encryption key for all response messages from the service server 100 to the computing device 120.

To render the response message, the user 130 need to provider the HK 180 generated by the hardware token 140 to the computing device 120. In one embodiment, the HK 180 is wirelessly transmitted from the hardware token 140 to the computing device 120. Infrared light signals or Bluetooth technologies can be used for such transmitting and receiving the HK between the hardware token 140 and the computing device 120. In another embodiment, the HK 180 is non-wirelessly transmitted, for example, through a USB port, from the hardware token 140 to the computing device 120. Since both the CHK 160 and HK 180 are same, the encrypted response message received from the service server 100 is decrypted and is rendered on the screen.

Notably, neither CHK 160 nor HK 180 is explicitly transmitted over the Internet. Therefore, this authentication method inherently reduces the risk for MITM attack. To prevent from compromising of the HK, the HK should be long enough.

It is to be appreciated that the user is able to access his/her multiple accounts at multiple service servers with EK and HK pairs generated by a single hardware token.

It would be appreciated that the invention is applicable to the user authentication in other communication networks without browsers, for example, credit card payment processing in point of sale systems, with telephone line. In such authentication, the credit card number of the user is used as the user identifier, and EK and/or HK are used to authenticate the user.

In addition to authentication, it would also be appreciated that the invention is applicable to sign a timed signature for a document. For example, adding the dynamic EK to an email so that the target email server is able to detect spam, and therefore, preventing the spam from reaching the user.

B. Hardware Token

Figure 2:
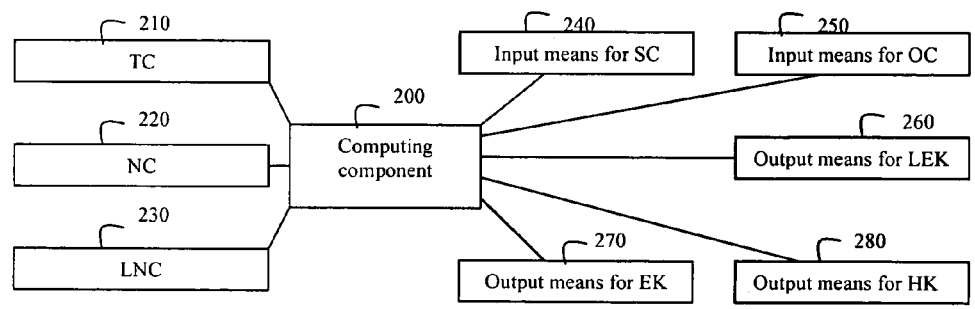
FIG. 2 shows schematically components of a hardware token to be used to authenticate a user according to one embodiment of the present invention.

The components of the hardware token are schematically shown in FIG. 2 according to one embodiment of the present invention. The token has a tamper-proof and irreversible time clock with a value of a time code (TC) 210 for generating dynamic keys in any second, a stored tamper-proof and non-volatile noise code (NC) 220 for securing hashed data, a stored tamper-proof and non-volatile license noise code (LNC) 230, means 240 for receiving and displaying the space code (SC) of the at least one service server, means 250 for receiving the owner code (OC) of the user to be authorized, means for generating the first exposed key (EK), means for generating the first hidden key (HK), means for computing a license exposed key (LEK), means for transmitting the HK or LEK to a selected device wirelessly or non-wirelessly, and means for storing an OC history list OCHL of a predefined number of the distinct received OCs ordered by their occurring frequencies so that the key computing time is increased exponentially with the order index of the newly received OC. The predefined number should be larger than 16.

The time code TC 210 is the current value of a temper-proof time clock in the hardware token. The TC 210 may be the number of seconds elapsed since a particular past time instance, e.g. since midnight Coordinated Universal Time (UTC) of Jan. 1, 1970. The TC 210 enables the hardware token to generate different exposed key (EK) and hidden key (HK) at different so that the generated EK and HK are one-time keys. The TC 210 may be synchronized with the clock at the service server with maximum error range in p seconds. p can be any number of seconds. For example, p can be 5 seconds.

The noise code (NC) 220 is a unique binary string in the hardware token to securing the hashed keys. The NC 220 is temper-proof and non-volatile. The NC 220 should be long enough, e.g. 10,000 bytes long, to prevent from being compromised. Only the token provider knows the value of NC.

The license noise code (LNC) 230 is similar to the NC 220 but with different values. The NC 220 is used for generating the exposed key (EK) and the hidden key (HK), while the LNC 230 is used for generating the license exposed key (LEK). Accordingly, only the token provider knows the value of the LNC 230.

The input means for the space code (SC) 240 is a means for receiving and storing the SC 240 that the user enters. The SC is a unique identifier that identifies the service server. The URL of the service server, e.g. www.bankofabcd.com, may be used as the for generating the EK and HK.

The input means for the owner code (OC) 250 is a means for receiving and storing the OC that the user enters. The OC is a password of the hardware token owner to perform key generation actions on the hardware token. The OC is shared by both the token provider and the owner of the hardware token.

The output means for the exposed key (EK) 270 is a means for displaying the generated exposed key EK that is hashed on TC 210, NC 220, SC 240 and OC 250 by the computing component 200. The EK may be of length 8 bytes long for easy reading and typing when the user logs in the service server.

The output means for the hidden key (HK) 280 is a device for emitting the signals of generated hidden key HK to a selected receiving device. The emitting device 280 may use the infrared light signal, or Bluetooth technology to transmit the HK to the receiver, such as the computer. Notably, the HK is obtained by hashing differently on TC 210, NC 220, SC 240 and OC 250 by the computing component 200. The HK may be 512 bytes long for securing the encryption of the response messages.

Similar to component 280, the output means for the license exposed key (LEK) 260 is a device for emitting the signal, of the generated license exposed key LEK to other receiving devices. Notably, the LEK is obtained by hashing differently on TC 210 and LNC 230 only by the computing component 200. The LEK may be of length 512 bytes long for securing the offline user authentication.

C. Computing the Exposed Key EK, the Hidden Key HK and the License Exposed Key LEK In one embodiment of the invention, both the exposed key EK and the hidden key HK are computed with different hash functions. The user computes the EK and HK with the hardware token assigned by the token provider. While the service server calculates the EK and HK based on the authentication license AL generated by the token provider. The hardware token and the authentication license AL share the same information such as the NC of the token and the OC of the user. If the EK computed at the service server is the same as the one provided by the user in the login session, the user is authenticated. If the HK generated by the token of the user matches the HK computed by the service server, the encrypted response messages can be decrypted and rendered by the browser at the user's computing device.

According to one embodiment of the invention, the user has a secret owner code (OC) for his/her hardware token. The hash functions are used in conjunction with a long secret NC of the token, a variable timestamp TC of the token, and a SC of the service server to derive various EK and HK pairs from a common OC. Since the hardware token never generate the EK and HK more than once at the same time, and the service server never verify the EK for the past time, the method is effective to defend against brute force attack or dictionary attack. This schema indeed expands the length of OC with the arbitrarily long NC to make brute force attack computationally infeasible.

A hash function is a transformation that takes a variable-size input and returns a fixed-size string, which is called the hash value. The desirable hash function H is a one-way function. That is, given a hash value h, it is computationally infeasible to find some input x such that $H(x)=h$. Examples of well-known hash functions are Secure Hash Algorithm (SHA), Message-Digest algorithm 5 (MD5). Let H be a hash function, such as SHA-2, or MD5, in the following descriptions.

Figure 3A:
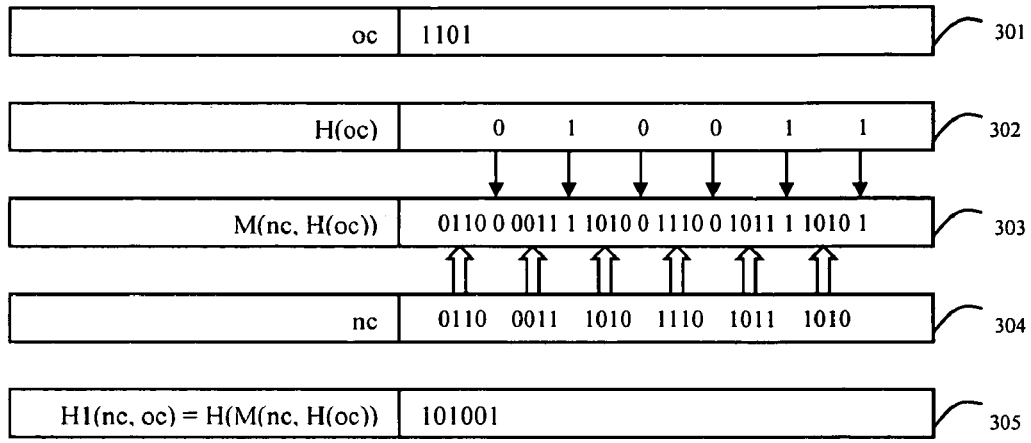
FIG. 3A is an example of a hash function H1 and a mix function M.

In one embodiment of the present invention, a mix function M is used for mixing the OC with the other data before the hash function H is employed, as shown in FIG. 3A. In block 301, the variable oc has binary value 1101. The hash value of H(oc) in block 302 is 010011, where H is a hash function. In block 304, the variable nc has binary value 01100011101011101011010. The mix value of nc and H(oc) with mix function M is shown in block 303. The function M inserts each bit of H(oc) into the binary string nc for every 4 bits. The internal 4 is obtained by dividing the length of nc by the length of H(oc). Therefore, the final mix value of M(nc, H(oc)) is 01100001110100111001011110101. Finally, block 305 displays the hash value of H1(nc, oc) defined by H(M(nc, H(oc)) is 101001. Note that H(M(x, H(y)) is a basic pattern in construct H1, H2, H3, H4, H5 and H6 for computing EK, HK and LEK in the present invention.

Bitwise exclusive OR operator XOR, widely used in the present invention, is defined as

0 XOR 0=0
0 XOR 1=1
1 XOR 0=1
1 XOR 1=0

Figure 3B:
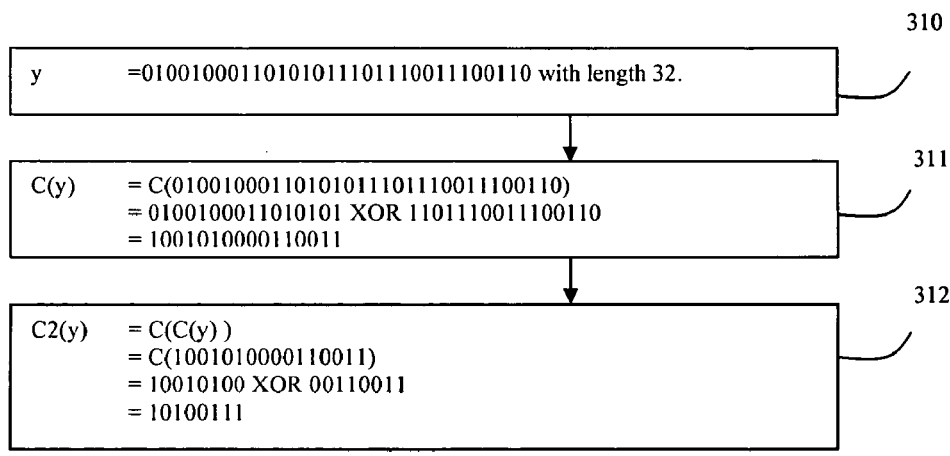
FIG. 3B is an example of a compression function C.

XOR operator is employed in the compression function C as shown in FIG. 3B. The function C reduces the length of the binary string y by performing bitwise XOR on the first half of y and the second half of y. In block 310, the input is a binary string y=01001000110101101110011100110 with length 32. Applying function C on y, or performing bitwise XOR operation on the first half of y 0100100011010101 and the second half of y 1101110011100110, the result 1001010000110011 is obtained in block 311. Block 312 shows the result of recursively performing function C twice, noted as C2 on y. C2(y) is C(C(y)) with the binary string result 10100111, or the hexadecimal string a7. Because EK will be entered by the user into the login web page, compression function C may be used, or recursively used to get the proper length of the EK as the hexadecimal string.

Figure 3C:
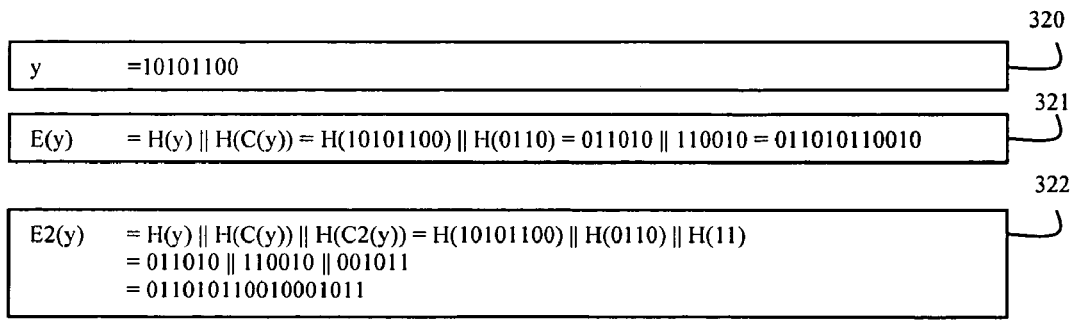
FIG. 3C is an example of an expand function E.

Since the hash value of H is fixed, for example, the hash value of MD5 is 128 bits, the hash value of SHA-1 is 160 bits, and the hash values of SHA-256 and SHA-512 are 256 bits and 512 bits respectively. In contrast to compression function C, an expand function E may be used in the present invention to expand the length of the hash value. FIG. 3C shows such a expand function E. In block 320, the input is a binary string y=10101100 with length 8. As shown in block 321, the expand function E on the input y, denoted as E(y), concatenates the hash value of y with the hash value of C(y). For example, if the hash value of H is 6 bits, H(10101100)=011010, and H(0110)=110010, then E(y)=H(y)||H(C(y))=H(10101100)||H(0110)=011010||110010=011010110010, where || is a concatenation operator. The length is E(y) is the double length of H(y).

Similarly, in block 322, E2(y) is the concatenation of E(y) with H(C2(y)). If the hash value of H(C2(y)), or H(11) is 001011, then the final result is 011010||110010||001011 or 011010110010001011. The length of E2(y) is three time of the length of H(y).

Figures 3D, 4:
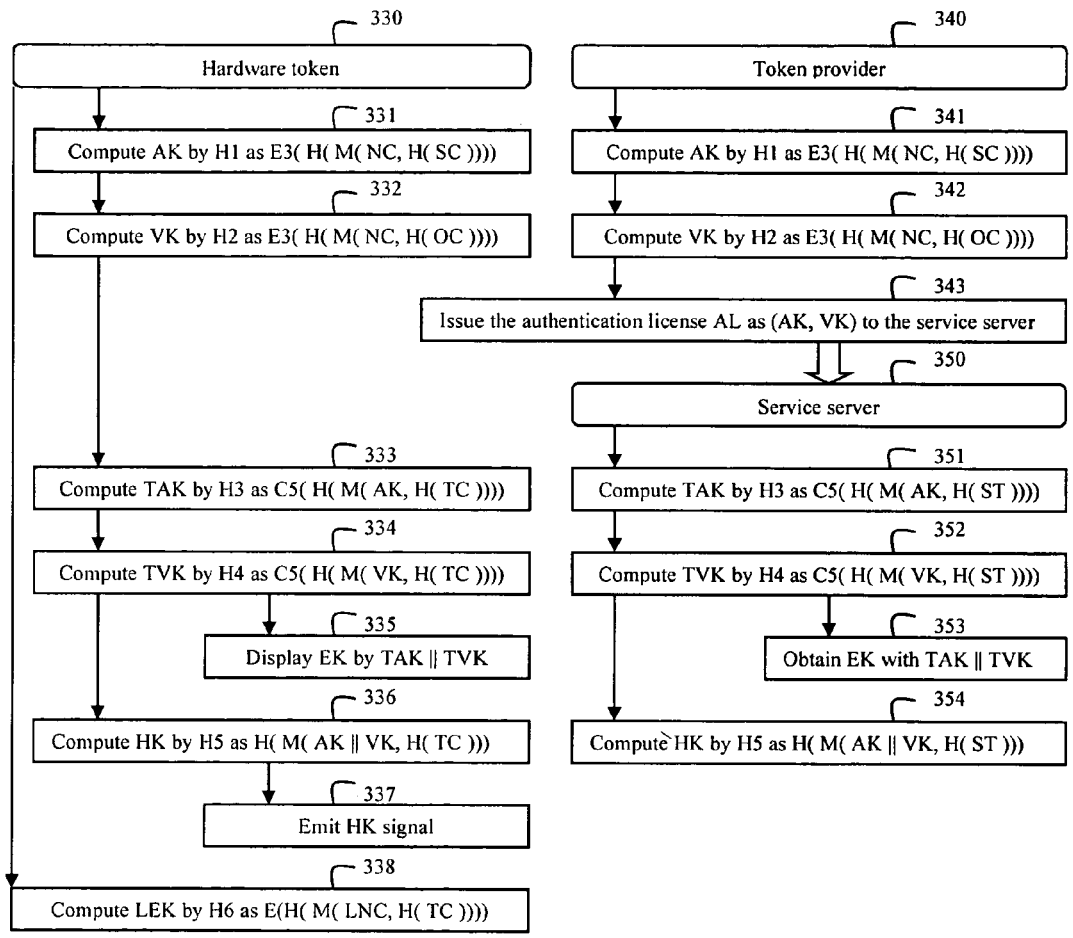
FIG. 3D illustrates schematically a method for generating an exposed key (EK) and a hidden key (HK) according to one embodiment of the present invention.
FIG. 4 is an example of an exposed key (EK) with TAK and TVK segments.
Figure 5:
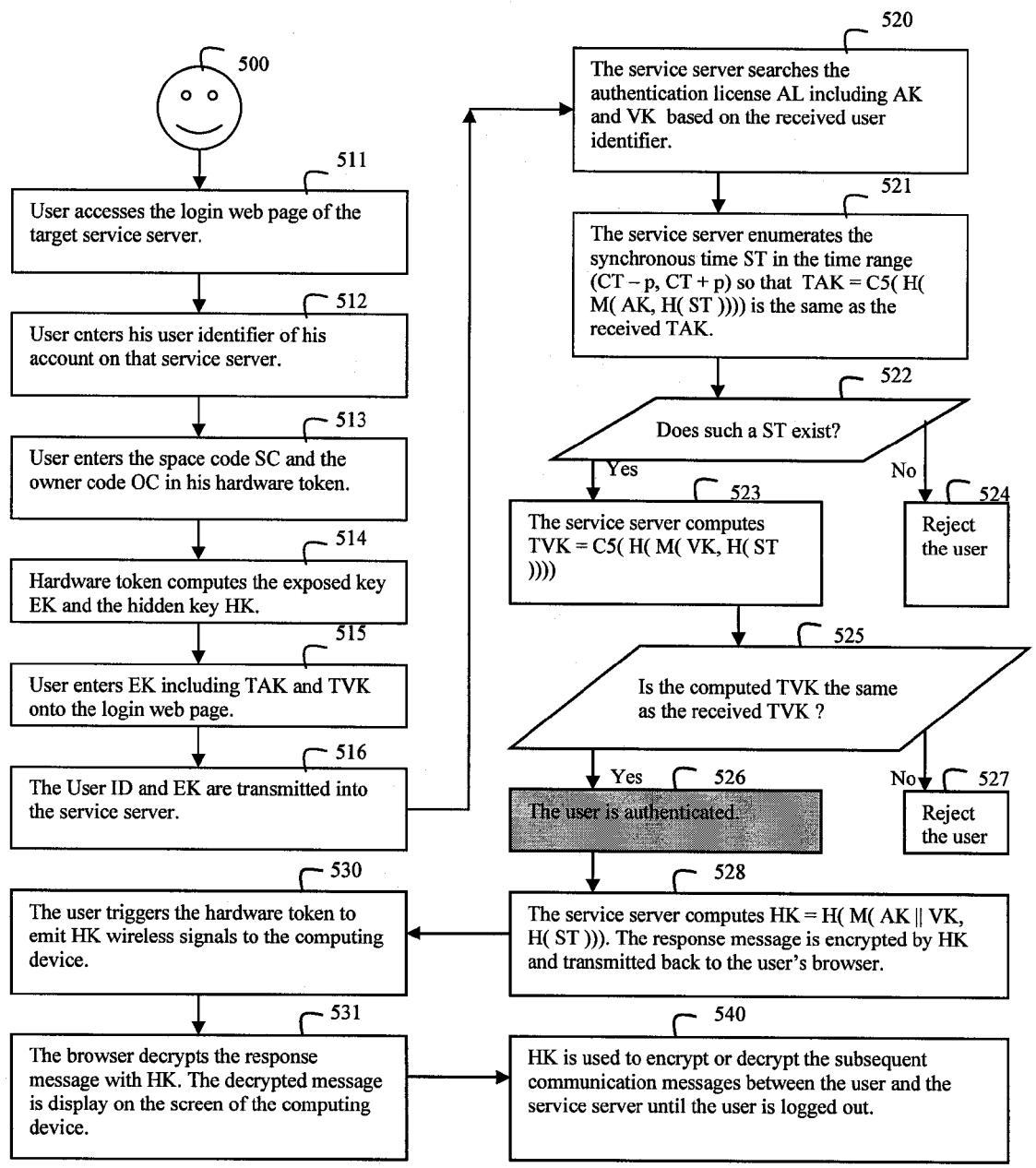
FIG. 5 is a flow diagram for authenticating a user with the EK and HK according to one embodiment of the present invention.

Assuming hash function H is SHA-512, the EK has the length of 32 bits, the HK has the length of 512 bits and the LEK has the length of 1024 bits. FIG. 3D is a flow diagram showing the steps of computing the EK, the HK and the LEK.

In one embodiment of the present invention, and referring now to FIG. 3D, prior to compute the EK and HK keys, the user may enter the SC 240 and OC 250 into the Hardware token 330. Hardware token 330 then computes AK with H1 as E3(H(M(NC, H(SC)))) in block 331, computes VK with H2 as E3(H(M(NC, H(OC)))) in block 332. The expand function E3 expands the hash value with 512 bits length to the length of 2048 bits.

In one embodiment, TAK is generated based on AK and TC, while TVK is generated based on VK and TC. Accordingly, TAK is computed with H3 as C5(H(M(AK, H(TC)))) in block 333, and TVK is computed with H4 as C5(H(M(VK, H(TC)))) in block 334. The compression function C5 reduces the hash value with 512-bits length to the length of 16-bits.

The Hardware token 330 finally computes EK by concatenating TAK and TVK with the total length 32-bits in block 335. The HK is computed with H5 as H(M(AK||VK, H(TC))) in block 336 with the length 512-bits for the HK, where || is a concatenation operator.

LEK is simply computed with H6 as E(H(M(LNC, H(TC)))) in block without involving SC and OC. The expand function E expands the hash value with 512 bits length to the length of 1024 bits. Note that LEK is based on LNC, not NC. The LEK will be described in further detail below.

On the other hand, the authentication license AL is computed by the token provider 340 in FIG. 3D. Since the NC, LNC, OC of the user are stored in the database of the token provider 340, AK 341 for SC is computed by the token provider 340 with H1 as E3(H(M(NC, H(SC)))) in block 341, and VK 342 for SC is computed by the token provider 340 with H2 as E3(H(M(NC, H(OC)))) in block 342. The expand function E3 expands the hash value with 512 bits length to the length of 2048 bits. The AL is then grouped with AK and VK in block 343, and is issued to the service server 350.

Note that the AL is different for different service server. The longer length of AL is recommended so that each service server is hard to compromise other's AL.

Once the service server 350 is issued with the authentication license AL 343 that contains AK and VK, the job of the service server is to pick up a synchronous time (ST) matching TC is in the hardware token 330. The ST could be found within the time range (CT−p, CT+p), where CT is the current time at the service server, and p is the time tolerance, such that the computed TAK with H3 as C5(H(M(AK, H(ST)))) is the same as the TAK from the received EK in the login session. The TVK is computed with H4 as C5(H(M(VK, H(ST)))).

For the convenience of reading and entering the EK, the EK is recommended to be presented as the hexadecimal number. Therefore, 32 bits EK may be have 8 hexadecimal digits, e.g. The final EK may be 3a8ed952, as shown in FIG. 4.

It is to be appreciated that H1, H2, H3, H4, H5 and H6 may employ different combinations of input codes NC, SC, WC, and TC, functions M, C, and E or other transformation functions without departing from the spirit and scope of the present invention. The recursive numbers of the compression function C and the expand function E may defined different from the examples above.

D. Authenticating the User with the EK and HK

In one embodiment of the present invention, the EK and HK generated by the hardware token are used to authenticate the user for accessing a service server. The authenticating procedure is as follows shown in FIG. 5.

Prior to the authentication of the user for accessing the user's account at the service server, a hardware token is assigned by the token provider to the user. An authentication license AL 343 that encodes the information of the hardware token, the user and the service server is generated by the token provider and provided to the service server.

At first, the user 500 accesses a login web page of the service server with the domain name of the service server in step 511, and enters his/her user identifier (UserID) of his/her account at the service server into the corresponding field on the login web page in step 512.

Thereafter, the user 500 enters the space code SC of the service server and the owner code OC into the hardware token in step 513. The SC may be the domain name of the service server, and the OC is a secrete password known only by the user and the token provider. Then the user presses a button on the hardware token to trigger the hardware token to compute the exposed and hidden keys, EK and HK.

The hardware token computes the exposed key EK 335 and the hidden key 336 in step 514. The generated EK is displayed on the hardware token. In step 515, the user enters the generated EK into the corresponding field on the login web page of the service server. Both the user identifier (UserID) and the EK are transmitted to the service server when the user click the submit button on the login web page in step 516.

In response to the login request by the user from a computing device, the service server searches its database to find the corresponding authentication license AL based on the received user identifier in step 520. The service server rejects the user if no such an AL is found.

Turning now to step 521, the service server computes TAK=C5(H(M(AK, H(ST)))) for each second ST within the time range of (CT−p, CT+p), where AK is included in AL, CT is the current time of the service server, p is a predefined constant. For example, let all times are counted from the midnight Coordinated Universal Time (UTC) of Jan. 1, 1970 in seconds. And let p be 25 seconds. Suppose the user generates the key on Feb. 2, 2010 at 08:08:00 based on the hardware token time clock. The time code TC of the hardware token is 1265098080. The user may spend 12 seconds to enter the EK, and the network may spend 3 seconds to transmit the EK from the user's browser to the service server. The service server may receive the login message including the EK on Feb. 2, 2010 at 08:08:15 based on the time clock at the service server. The current time CT of the service server is 1265098095. In this case, the service server computes all possible TAKs within the time range (1265098095−25, 1265098095±25), or (1265098070, 1265098120). Because this range covers TC 1265098080 of the hardware token, the service server cannot miss TC in general network traffic condition. Note that p should be big enough to tolerate the asynchronous time clock between the hardware token and the service server.

In step 522, if one of TAKs computed by the service server within the time range is the same as the TAK included in the received EK, then go to step 523. Otherwise the user is rejected in step 524.

The service server computes TVK=C5(H(M(VK, H(ST)))) in step 523 with the ST obtained in step 522, VK from AL. if the TVK computed by the service server is same as the TVK included in the received EK, then the user is authenticated in step 526. Otherwise, the user is rejected in step 527.

The service server further computes the hidden key HK=H (M(AK||VK, H(ST))) with the ST obtained in step 522, AK and VK from AL. The response message is encrypted by HK and transmitted back to the user's browser in step 528.

After receiving the decrypted response message from the service server, the browser may popup a dialog to ask the user to provide the HK. The user may click a button on the hardware token to emit the wireless signals of HK paired with the EK to the computing device used for login in step 530.

The wireless signal receiver of the computing device provides the HK to the browser. The browser then decrypts the response message with the HK so that the decrypted message is displayed on the screen of the computing device in step 531.

The HK could be used to encrypt and decrypt the subsequent communication messages between the browse and the service server for the current session in step 540 until the user is logout.

E. Preventing Account Lockout and Trojan Attacks

A popular way to prevent the brute force attack from revealing the password is to block the subsequent account accesses from anyone if the number of login failures for that account hits a predefined threshold. Once the account is blocked, the legitimate user has to communicate the service server with other channels to reset the account.

In one embodiment of the present invention, the EK includes TAK 410 and TVK 420 as shown in FIG. 4. The service server has a failure number FN with initial value 0 for each account. FN is set to be 0 if the user of the account is authenticated. FN is increased by 1 if the computed TAK matches the received TAK but the computed TVK doesn't match the received TVK. The account is blocked if the FN hits a predefined number.

Notably, the TAK involves the noise code NC of the hardware token and the TVK involves the OC of the user. If the computed TAK matches the received TAK but the computed TVK doesn't match the received TVK, it is possible that someone is using the hardware token with the wrong OC. The failure time FN should be counted in this case. One the other hand, if the received TAK could not be reproduced from the AL within the time range at the service server, the EK is not newly generated by the corresponding hardware token. This trial access of the hacker can be ignored.

In one embodiment of the present invention, the service server has a used timestamp UT for each account. When a user is authenticated, the UT is set to be the synchronous time ST used to compute the CEK and the CHK at the service server. In a future authentication, the new ST must be not only within the new time range (CT−p, CT+p), but also larger than the UT of the account. With this schema, each generated EK can be used only once to prevent Trojan attack.

In one embodiment of the present invention, the hardware token will store an OC history list OCHL of a predefined number of distinct received OCs ordered by their occurring frequencies so that the key computing time will be increased exponentially with the order index of the newly received OC. This method will prevent the unauthorized person from generating the large number of exposed keys with the hardware token in the short time period. For example, the hardware token has the list of 4 received OCs with order (OC=9ab2556, frequency=1023), (OC=563bf34c2, frequency=2), (OC=84d103277, frequency=1) and (OC=32e563bf, frequency=1). If the user wants to generate the EK and HK with OC=123abc94, the time spent in computing the result is 2 to the power 5 seconds, or 32 seconds. Now the hardware token has 5 OCs in the list with (OC=123abc94, frequency=1) as the last item. If the user wants to generate the EK and HK with OC=abc95482, the time spent in computing the result is 2 to the power 6 seconds, or 64 seconds. But when the user enters OC=9ab2556 to generate the EK and HK, the time spent in computing the keys is 2 to the power 1 seconds, or 2 seconds, since the order index of OC=9ab2556 is 1.

The legitimate user may clear the OCHL within a predefined time period after the user enters the OC with the largest frequency.

It would be appreciated that delaying computing time may be determined with other mathematical computation without departing from the spirit and scope of the present invention.

F. Authenticating a User with a Token of a Delegate

One of challenges of using a hardware token for user authentication is that the user cannot access any of his/her accounts if the hardware token is not available temporally or the hardware token is stolen.

In one embodiment of the present invention, the service server can authenticate the user by using the EK and HK generated by his/her delegate's hardware token and the user's OC.

Figure 6:
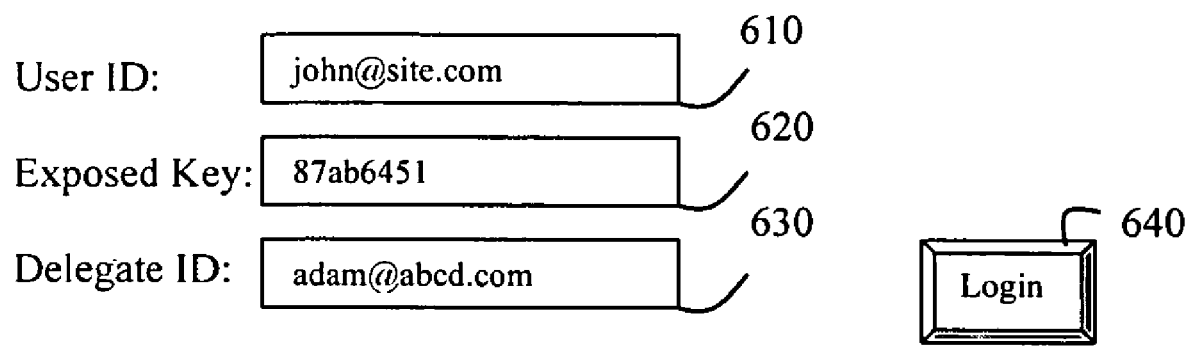
FIG. 6 is an example of login web page with the EK generated by the hardware token of a delegate of the user.
Figure 7:
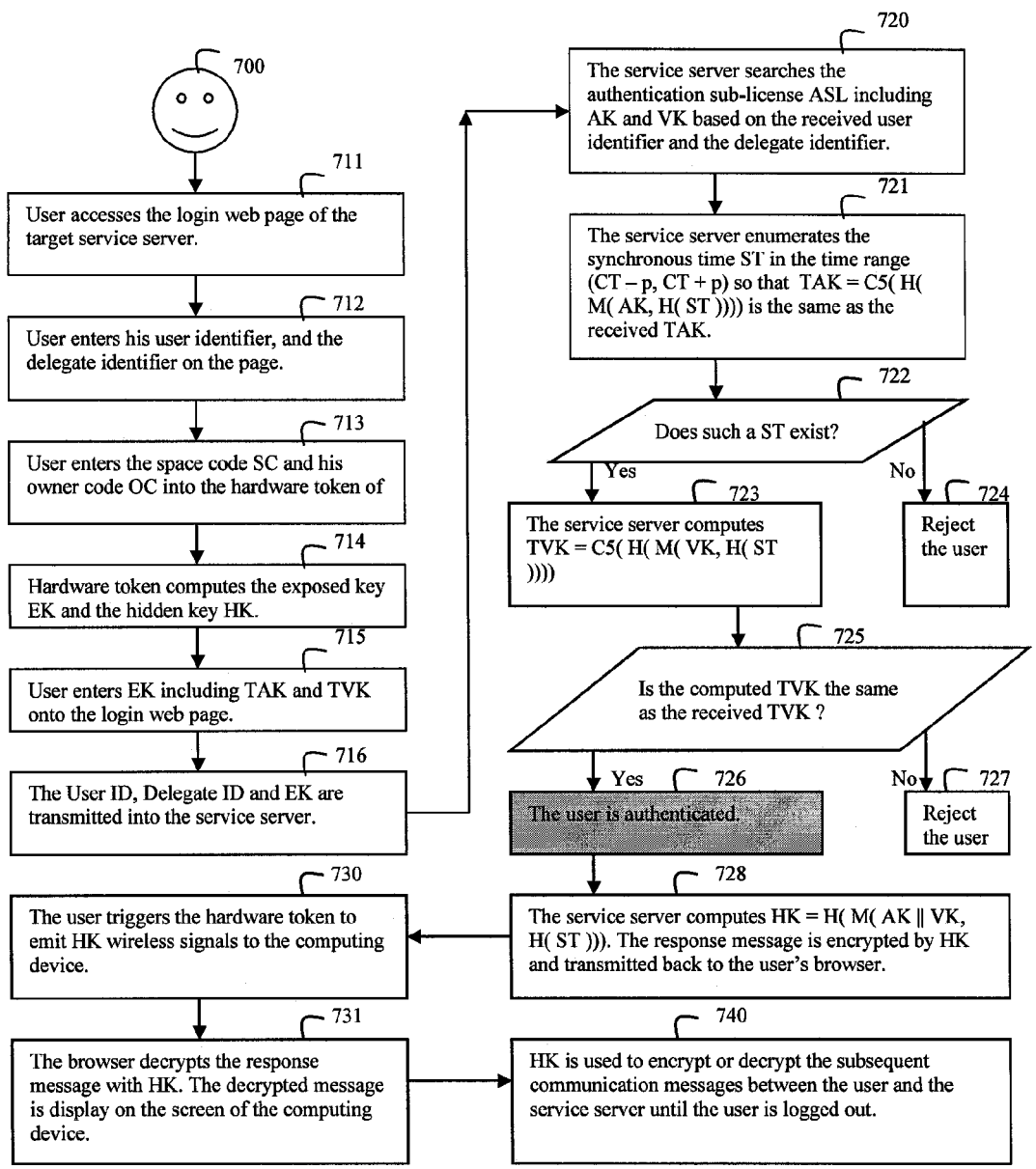
FIG. 7 is a flow diagram for authenticating a user with the hardware token of a delegate of the user according to one embodiment of the present invention.

FIG. 6 shows a login web page for the EK generated by a delegate's hardware token. The user enters the UserID 610 of his/her account at the service server. The user also needs to provide the delegate ID (DelegateID) 630 whose hardware token is used in the current login. The user then enters his/her owner code OC and the SC of the service server into the delegate's hardware token to generate the EK, which is typed in the exposed key field 620 of the login web page. Clicking the login button 640 starts the login procedure.

Note that prior to the authentication, the user has to request the token provider to send the service provider an authentication sub-license ASL. Such an ASL includes the AK hashed on the NC of the delegate's hardware token, the VK hashed on the user's OC as described in the flowchart in FIG. 7.

At first, the user 700 accesses the logon web page of the service server with the domain name of the service server in step 711, and enters the user identifier of his/her account at the service server into the corresponding field on the login web page in step 712. Additionally, the user enters the delegate identifier into the corresponding field on the login web page in step 712 so that the hardware toke of that delegate is able to be used in the current login.

Thereafter, the user enters the space code SC of the service server and the owner code OC into the hardware token of the delegate in step 713. The SC may be the domain name of the service server, and the OC is the user's own owner code. The OC is a secrete password known only by the user and the token provider. Then the user presses a button on the hardware token of the delegate to trigger the hardware token to compute the keys.

The hardware token computes the exposed key EK 335 and the hidden key 336 in step 714, and displays the EK thereon. In step 715, the user enters the EK into the corresponding field on the login web page. The user identifier, the delegate identifier and the EK are transmitted to the service server when the user click the submit button or the login button on the login web page in step 716.

In response to the login request from the user, the service server searches its database to find the corresponding authentication sub-license ASL based on the received user identifier and the received delegate identifier in step 720. The service server rejects the user if no such an ASL is found.

Turning now to step 721, the service server computes TAK=C5(H(M(AK, H(ST)))) for each second ST within the time range (CT−p, CT+p), where AK is included in ASL, CT is the current time of the service server, p is a predefined constant.

In step 722, if one of TAKs computed by the service server within the time range is the same as the TAK included in the received EK, then go to step 723. Otherwise the user is rejected in step 724.

The service server computes TVK=C5(H(M(VK, H(ST)))) in step 723 with the ST obtained in step 722, VK from ASL. If the TVK computed by the service server is same as the TVK included in the received EK, then the user is authenticated in step 726. Otherwise, the user is rejected in step 727.

The service server further computes the hidden key HK=H(M(AK∥VK, H(ST))) with the ST obtained in step 722, AK and VK from ASL. The response message is encrypted by the computed HK and transmitted back to the user's browser in step 728.

After receiving the decrypted response message from the service server, the browser may popup a dialog to ask the user to provide the HK generated by the token of the user's delegate. The user may click a button on the hardware token to emit the wireless signals of HK paired with the EK to the computing device used for login in step 730.

The wireless signal receiver of the computing device provides the generated HK to the browser. The browser then decrypts the response message with the generated HK so that the decrypted message is displayed on the screen of the computing device in step 731.

The HK could be used to encrypt and decrypt and communication messages between the browse and the service server for the current session in step 740 until the user is logout.

It would be appreciated that one user may have multiple delegates.

G. Requesting a Content License for Rendering the Protected Content

Figure 8:
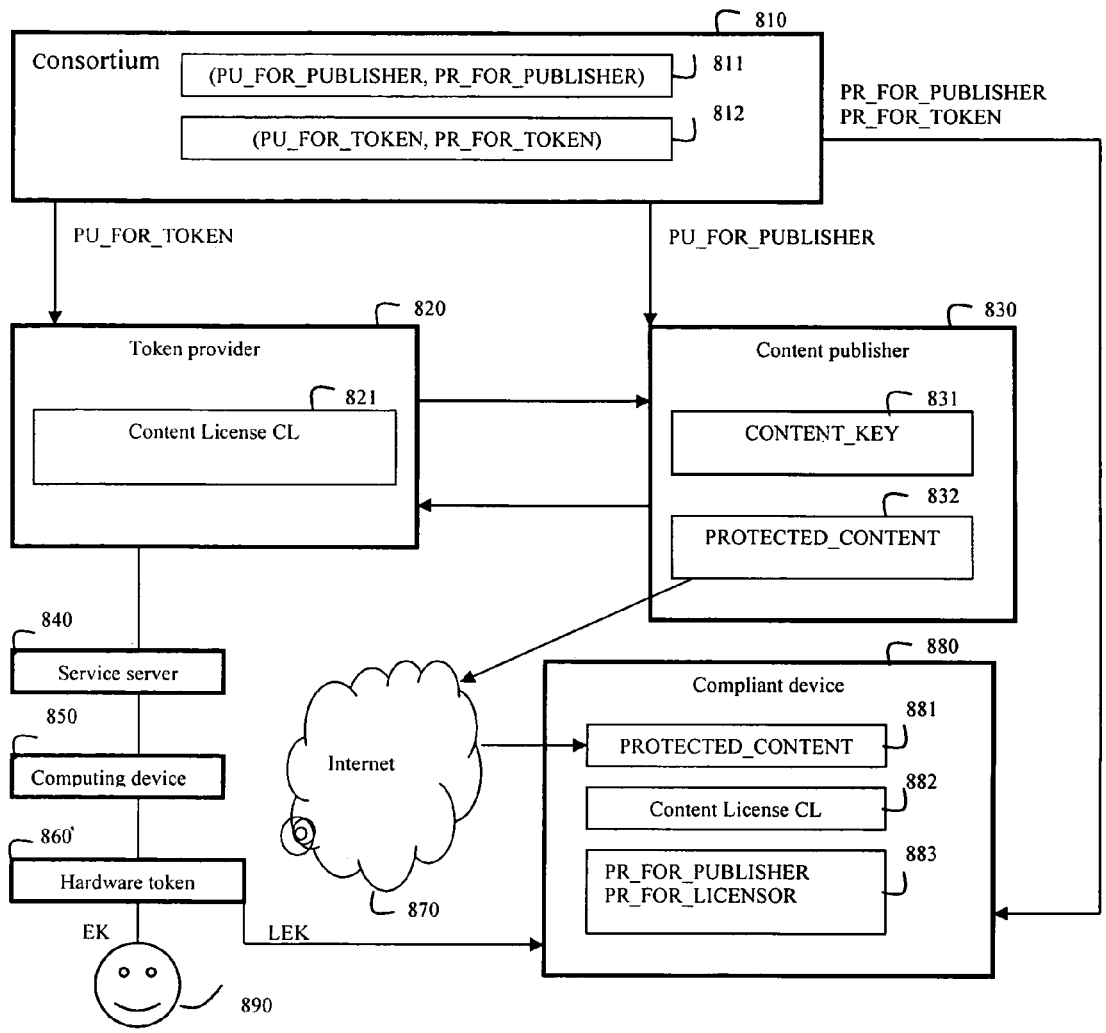
FIG. 8 is a flow diagram for authenticating an offline user with a hardware token according to one embodiment of the present invention.

FIG. 8 shows a flowchart of an offline user authentication with the token for rendering offline protected digital content according to one embodiment of the invention. The offline system includes a content publisher, a compliant device, a service server and a hardware token assigned by a token provider. The compliant device has a core content token installed therein. The service server has a uniquely global identifier (SC) and are adapted for providing a content license (CL) of the protected digital content. The user has an account established with an account identifier (UserID) in the service server, a hardware token assigned by the token provider, and an owner code (OC) known only by the user and the token provider. The SC and the OC are stored in a database of the token provider.

The consortium 810 is set up by the content publishers 830, license issuer (service server) 820, and rendering device manufactures for enforcing certain features in the rendering devices produced by the member manufactures. These features includes restricting rendering signals which could be used to extract a high-quality digital copy of the original digital content, installing a core content token (CCT) with the tamper-proof content decryption keys, and guaranteeing to enforce DRM policies associated with the content rendered. The rendering device with these features is called a compliant device 880.

Consortium 810 generates two pairs of public and private keys (PU_FOR_PUBLISHER, PR_FOR_PUBLISHER) 811 and (PU_FOR_TOKEN, PR_FOR_TOKEN) 812.

For each new piece of digital content, the content publisher 830 generates a globally unique identifier CONTENT_ID, and a random key CONTENT_KEY 831. The digital content is then encrypted by the CONTENT_KEY with a symmetric encryption algorithm to form a protected digital content PROTECTED_CONTENT 832. The protected digital content is freely distributed over Internet 870. The user can download the protected content 881 freely into his/her compliant device 880.

To render the protected digital content 881, the user 890 has to buy a content license CL from a service server 840 using hardware token 860 from a browser on a computing device 850. The content license CL 882 will be downloaded into the compliant device 880 in order to render the protected content 881.

In one embodiment, the user 890 logs in the service server 840 with the EK generated by the hardware token 860. Of course, the user needs to enter the correct OC and SC to the hardware token so as to obtain the proper EK and HK for this CL request. After login and authentication, the user 890 provides the information to the service server 840. The information includes the desired CONTENT_ID, and the required digital rights, such as the expired date of the content license.

The service server 840, in turn, requests the token provider to generate the content license CL for the user based on the UserID, CONTENT_ID, and the required digital rights.

The token provider 820 generates the CL with the help of the content publisher 830, and returns the CL to the service server 840. The service server 840 may pay a fee to the token provider 820 and the content publisher 830 each time when such a CL is requested.

Then, the CL is transmitted to the computing device 850 from the service server 840. And finally the CL is installed in the compliant device 880 by the user 890.

H. Computing the Content License

Figure 9:
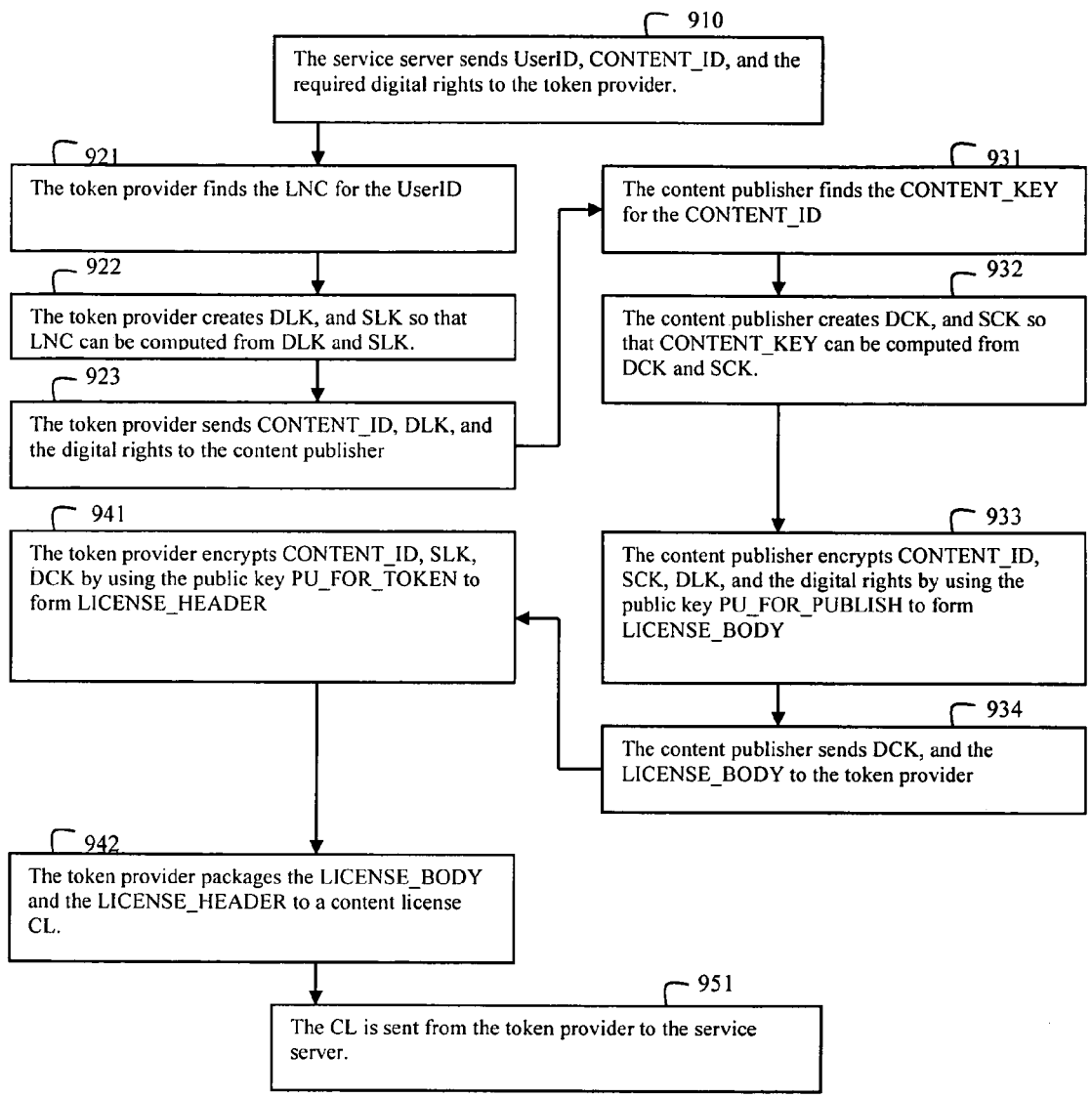
FIG. 9 is a flow diagram for computing a content license AL.

In one embodiment of the present invention, the token provider creates a content license CL in response to the request of the user, as shown in FIG. 9.

The token provider knows the LNC for the user identified with UserID and holds the RSA public key PU_FOR_TOKEN. While the content publisher knows the CONTENT_KEY for the digital content identified with CONTENT_ID and holds the RSA public key PU_FOR_PUBLISHER.

In step 910, the service server transmits the collected data, UserID, CONTENT_ID, and the required digital rights to the token provider through a secure channel.

The token provider searches its database to find the corresponding the license noise code LNC for the given UserID in step 921.

Instead of storing the LNC directly into the license, the token provider divides the LNC into 2 pieces DLK and SLK in step 922, so that the LNC is easily reconstructed from the DLK and SLK, but DLK alone, or SLK alone reveals no information about LNC. The token provider first creates a random dynamic license key DLK, with the same length of LNC of the user. Then a supplemental license key SLK, by applying exclusive OR operation on DLK and LNC, is created so that LNC can be revealed by using exclusive OR on DLK and SLK.

The token provider transmits the CONTENT_ID, DLK, and the digital rights to the corresponding content publisher through a secure channel in step 923.

After receiving the data, the content publisher searches its database to find the corresponding CONTENT_KEY for the CONTENT_ID in step 931.

With the same approach, the content publisher divides the CONTENT_KEY into 2 pieces DCK and SCK in step 932, so that the CONTENT_KEY is easily reconstructed from the DCK and SCK, but DCK alone, or SCK alone reveals no information about the CONTENT_KEY. The content publisher first creates a random dynamic content key DCK, with the same length of the CONTENT_KEY of the digital content. Then a supplement content key SCK, by applying exclusive OR operation on DCK and CONTENT_KEY, is created so that the CONTENT_KEY can be revealed by using exclusive OR on DCK and SCK.

Once the SCK is created, the content publisher encrypts CONTENT_ID, SCK, DLK, and the digital rights by using the RSA public key PU_FOR_PUBLISH to form a content license body LICENSE_BODY in step 933.

Then, the content publisher transmits the DCK, and the LICENSE_BODY back to the token provider in step 934.

After receiving the data from the content publisher, the content publisher encrypts CONTENT_ID, SLK and DCK by using the RSA public key PU_FOR_TOKEN to form a content license header LICENSE_HEADER in step 941.

In step 942, the token provider packages the LICENSE_BODY and the LICENSE_HEADER to form a content license CL.

Finally, the CL is sent to from the token provider to the service server.

1. Authenticating the Offline User with the Compliant Device

Figure 10:
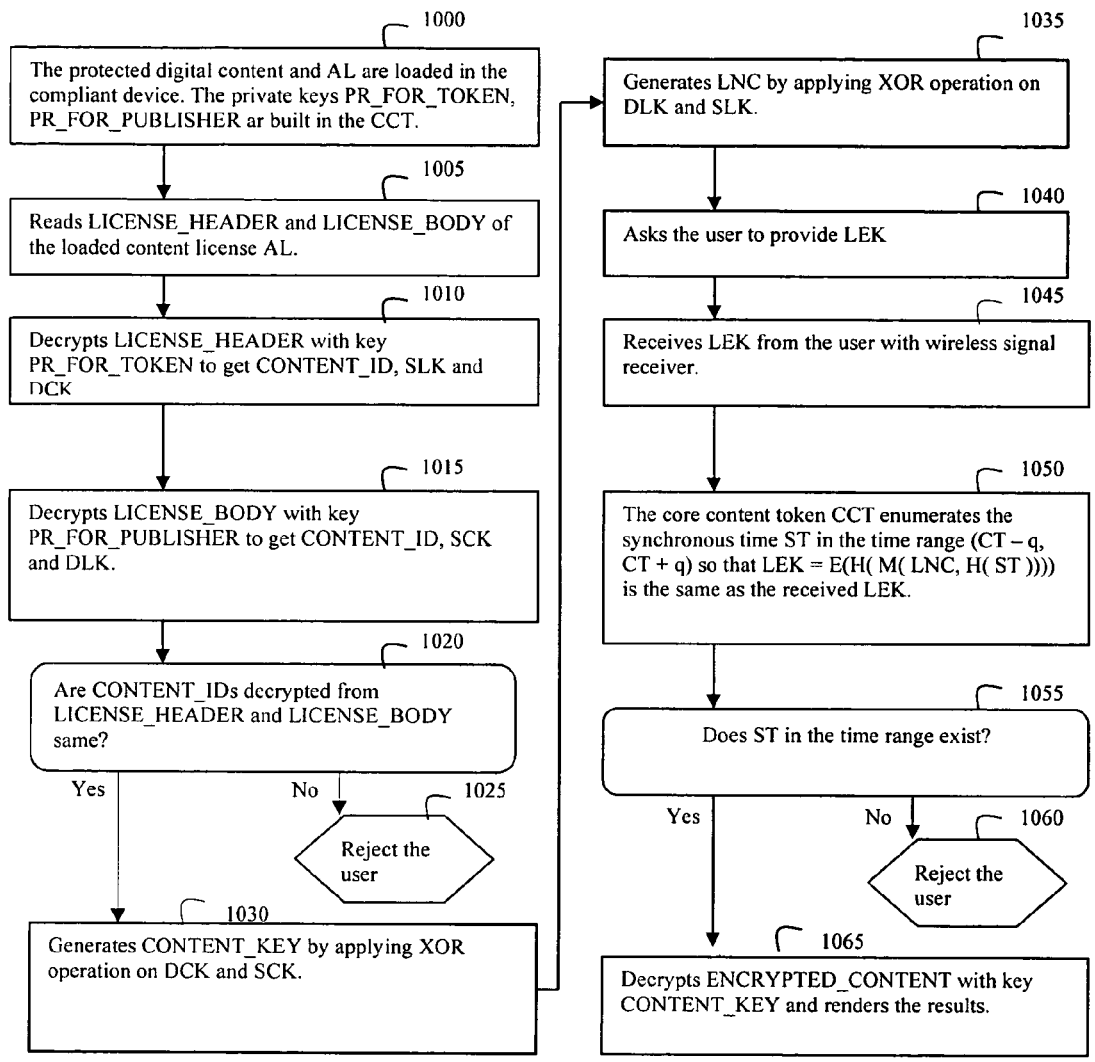
FIG. 10 is a flow diagram of authenticating a user at the compliant device according to one embodiment of the present invention.

Referring to FIG. 10, in one embodiment of the present invention, a core content token CCT installed in the compliant device is utilized to authenticate the offline user and render the protected digital content.

At first, the core content token CCT stores the built-in private keys PR_FOR_TOKEN and PR_FOR_PUBLISHER. The protected digital content and the content license CL are loaded in the compliant device in step 1000.

The core content token reads the LICENSE_HEADER and LICENSE_BODY of the CL in step 1005.

The CCT decrypts LICENSE_HEADER with the RSA private key PR_FOR_TOKEN to get CONTENT_ID, SLK and DCK in step 1010.

Additionally, the CCT decrypts LICENSE_BODY with the RSA private key PR_FOR_PUBLISHER to get CONTENT_ID, SCK, DLK, and the digital rights in step 1015.

The CCT verifies the CL in step 1020. If the two CONTENT_IDs decrypted from the LICENSE_HEADER and LICENSE_BODY are different, reject the user in step 1025. Otherwise, the CCT generates CONTENT_KEY by applying exclusive OR operation on DCK and SCK in step 1030. Similarly the CCT generates LNC by applying exclusive OR operation on DLK and SLK in step 1035.

The compliant device now requests the user to provider LEK in step 1040. The request may be presented in the screen of the compliant device.

The user may press a button on his/her hardware token to compute the LEK and to transmit a wireless signal of computed LEK to the compliant device. The compliant device receives the LEK with a wireless signal receiver and transmits the LEK to the CCT in step 1045.

In step 1050, once receiving the LEK, the core content token CCT tries to find a synchronous time ST in the time range (CT−q, CT+q) so that LEK=E(H(M(LNC, H(ST)))) is the same as the received LEK, where CT is the current time of the clock on the CCT, and q is a constant. Since typing is needed, q may be set as 2 seconds or more.

The LEK is verified in step 1055. If the received LEK cannot be reproduced within the time range, the user is rejected in step 1060. Otherwise, the CCT decrypts the PROTECTED_CONTENT with the key CONTENT_KEY in step 1065. The decrypted content will be rendered by the compliant device as the user requested.

As should be appreciated, when the hardware token starts to generate the LEK, the authentication procedure can be changed as follows:

(1). the hardware token is triggered by the user to generate the license exposed key;
(2). the hardware token emits the requesting signal for rendering the protected digital content to the compliant device;
(3). the CCT generates a random challenge number CHALLENGE;
(4). the compliant device emits CHALLENGE signal;
(5). the hardware token receives the CHALLENGE signal;
(6). the hardware token generates a challenged license exposed key CLEK=E(H(M(LNC||CHALLENGE, H(ST)))), where || is a concatenation operator;
(7). the CCT receives CLEK;
(8). the CCT tries to find a synchronous time ST in the time range (CT−q, CT+q) so that CLEK=E(H(M (LNC||CHALLENGE, H(ST)))) is the same as the received CLEK, where CT is the current time of the clock on the CCT, and q is a constant. Since typing is needed, q may be set as 2 seconds.
(9). The user is authenticated if the received CLEK can be reproduced within the time range.

It is to be appreciated that the used timestamp UT can be trivially put into CCT. Multiple LEK/CLEK generations and verifications can be performed for one request of rendering the protected digital content in order to prevent the unauthorized users from remotely using the hardware tokens of the authorized users.

The present invention, among other things, discloses a system and method that utilize an exposed key and a hidden key both generated by a hardware token to ensure the identity of the user for a service server. The hardware token is assigned to the user by a token provider. The service server has an authentication license associated with the user, which is pre-generated by and provided from the token provider. In a login session, a user identifier and an associated exposed key are required with a browser of a computing device over Internet. The exposed key is generated by the hardware token with hashing functions. The user is authenticated if an exposed key computed by the service server based on the authentication license is same as the received exposed key. After authentication, the service server computes a hidden key based on the authentication license, and then sends a response message encrypted by the hidden key. The user must provide the hidden key generated by the hardware token to the browser of the computing device to decrypt the response messages.

Additionally, the present invention, among other things, also discloses a system and method that employ a license exposed key and a content license to authenticate an offline user for rendering a protected digital content on a compliant device. The license exposed key is generated by a hardware token assigned by a token provider, based on only the information built in the hardware token. The content license including both content encryption information and the license exposed key is created by a process involved with the content publisher and the token provider. The compliant device authenticates the user if the correct content license and the license exposed key are presented. Because the license exposed key can be used only once, the user cannot share his/her license exposed key with others.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method for digitally authenticating a user over a network system having at least one service server, at least one client device and a token provider communicable with one another through the internet, wherein the user has an account established with an account identifier (UserID) in the at least one service server and the token provider, a hardware token assigned by the token provider, and an owner code (OC) known only by the user and the token provider, wherein the at least one service server has a uniquely global identifier (SC) and an authentication license (AL) associated with the identification information of the at least one service server, the hardware token and the user, wherein the AL is provided by the token provider and stored in the at least one service server, wherein the UserID SC and the OC are stored in a database of the token provider, and wherein the hardware token is communicable with the at least one client device, comprising the steps of:
   a. entering the SC and the OC into the token by the user;
   b. generating a first exposed key (EK) and a first hidden key (HK) by the token, wherein each of the EK and the HK is associated with at least the SC and the OC, and a time code (TC) and a noise code (NC) of the token, wherein the TC is the current time of the token when the EK and the HK are generated, and the NC is a built-in secret string of the token;
   c. initializing a user login session of the at least one service server from the at least one client device by the user to enter the UserID and the generated EK and HK thereinto, wherein the UserID and the generated EK are transmitted to the at least one service server through the internet;
   d. computing a second exposed key (CEK) and a second hidden key (CHK) by the at least one service server based on the AL provided by the token provider;
   e. authenticating the user by at the at least one service server when the CEK is the same as the received EK;
   f. sending a response message to the at least one client device by the at least one service server, wherein the response message is encrypted with the CHK; and
   g. decrypting the response message received from the at least one service server at the at least one client device with the HK.

2. The method of claim 1, wherein the hardware token comprises at least:
   a. a tamper-proof and irreversible time clock with a value of a time code (TC) for generating dynamic keys in any second;
   b. a stored tamper-proof and non-volatile noise code (NC) for securing hashed data;
   c. a stored tamper-proof and non-volatile license noise code (LNC);
   d. means for receiving and displaying the space code (SC) of the at least one service server;
   e. means for receiving the owner code (OC) of the user to be authorized;
   f. means for generating the first exposed key (EK);
   g. means for generating the first hidden key (HK);
   h. means for computing a license exposed key (LEK);
   i. means for transmitting the HK or LEK to a selected device wirelessly or non-wirelessly; and
   j. means for storing an OC history list OCHL of a predefined number of the distinct received OCs ordered by their occurring frequencies so that the key computing time is increased exponentially with the order index of the newly received OC.

3. The method of claim 2, wherein the step of generating the first exposed key (EK) by the token comprises the steps of:
   a. computing a first account-lockout-proof key (AK) by hashing a combination of the NC of the token and the SC of the at least one service server using a first hash function H1;
   b. computing a first verifier key (VK) by hashing a combination of the NC, the SC and the OC using a second hash function H2;
   c. computing a timed account-lockout-proof key (TAK) by hashing a combination of the TC and the AK using a third hash function H3;
   d. computing a timed verifier key (TVK) by hashing a combination of the TC and the VK using a fourth hash function H4; and
   e. generating the first exposed key (EK) by concatenating the TAK and the TVK.

4. The method of claim 3, wherein the authentication license (AL) is generated by the token provider by:
   a. computing a second account-lockout-proof key (CAK) by hashing a combination of the NC of the token and the SC of the at least one service server using the first hash function H1;
   b. computing a second verifier key (CVK) by hashing a combination of the NC, the SC and the OC using the second hash function H2;
   c. generating the AL by grouping the CAK and the CVK; and
   d. send back the AL back to the at least one service server, wherein the NC of the token, the SC of the at least one service server and the OC of the user are stored in the database of the token provider, and identified by the associated UserID sent from the at least one service server.

5. The method of claim 1, wherein the step of authenticating the user by at the at least one service server comprises the steps of:
   a. finding a synchronous time ST within the range of (CT−p, CT+p), wherein the CT is the current time of the at least one service server, and p is a time tolerance, such that the value of hashing a combination of the ST and the CAK of the authentication license (AL) using the third hashing function H3 is same as the TAK contained in the received EK;
   b. authenticating the user by sending the response message to the at least one client device if the ST exists in the range of (CT−p, CT+p) and the value of hashing a combination of the ST and the CVK of the authentication license (AL) using the fourth hash function H4 is same as the TVK contained in the received EK; and
   c. storing the ST as a new used timestamp (UT) in the at least one service server if the user is authenticated.

6. The method of claim 5, further comprising the step of rejecting the user if the ST is out of the range of (CT−p, CT+p).

7. The method of claim 5, further comprising the step of rejecting the user if the ST is in the range of (CT−p, CT+p) and the value of hashing the combination of the ST and the CVK of the authentication license (AL) using the fourth hash function H4 is different from the TVK contained in the received EK.

8. The method of claim 5, further comprising the step of rejecting the user if the found synchronous time ST is less than or same as the stored used timestamp UT, thereby ensuring each EK being used for authentication only once.

9. The method of claim 5, further comprising verifying an account-lockout-proof key segment of the EK on the at least one service server during the login session so as to prevent account lockout attacks, wherein the verifying step comprises the steps of:
   a. setting a failure number (FN) as 0 for the account when the user is authenticated;
   b. blocking the account when the failure number FN of the account exceeds a pre-defined number; and
   c. increasing the FN by 1 only if the a value of hashing a combination of the ST and the CAK of the authentication license (AL) using the third hashing function H3 is same as the TAK contained in the received EK, while the value of hashing a combination of the ST and the CVK of the authentication license (AL) using the fourth hash function H4 is different from the TVK contained in the received EK, wherein the FN is initially set as 0.

10. The method of claim 5, wherein the first hidden key (HK) is generated by the token by hashing a combinations of the AK, the VK and the TC using a fifth hash function H5 at the time when the EK is generated in the token, and wherein the second hidden key (CHK) is computed by the at least one service server by hashing a combinations of the CAK, the CVK and the ST with the fifth hash function H5, by the at least one service server after the ST is found.

11. The method of claim 1, wherein the step of decrypting the response message received from the at least one service server at the at least one client device by the HK comprises the steps of:
   a. transmitting the HK from the token to the at least one client device wirelessly or non-wirelessly;
   b. decrypting the received response message by the HK with an algorithm that is utilized to encrypt the response message by the CHK at the at least one service server; and
   c. rendering the decrypted response message on the at least one client device.

12. The method of claim 1, further comprising the step of authenticating the user by the at least one service server over the internet with a hardware token owned by a delegate of the user, wherein the authenticating step comprises the steps of:
   a. registering a delegate identifier (DelegateID) of the delegate at the token provider by the user with confirmation of the delegate, wherein the delegate has a hardware token assigned by the token provider;
   b. sending a new authentication license associated with the user to the at least one service server by the token provider, wherein the new authentication license includes an additional mixture user-delegate authentication sub-license (ASL); and
   c. authenticating the user with the hardware token of the user's delegate, and the mixture user-delegate authentication sub-license ASL.

13. The method of claim 12, wherein the mixture user-delegate authentication sub-license ASL for the user is generated by the token provider with the steps of:
   a. computing an account-lockout-proof key (AK) by hashing a combination of the NC of the token of the delegate and the SC, using the first hash function H1;
   b. computing a verifier key (VK) by hashing a combination of the NC of the token of the delegate, the SC and the OC of the user using the second hash function H2; and
   c. generating the mixture user-delegate authentication sub-license ASL by grouping AK and VK.

14. The method of claim 12, wherein the step of authenticating the user with the hardware token of the delegate of the user comprises the steps of:
   a. providing the delegate identifier (DelegateID) by the user during the login session;
   b. providing the EK and the HK by the user with the hardware token of the delegate using the user's owner code OC and the space code SC of the at least one service server;
   c. authenticating the user by the at least one service server if the exposed key, hashed on the found ST and the information included in the mixture user-delegate authentication sub-license ASL with H3 and H4, matches the received EK;
   d. using the HK, hashed on the found ST and the information included in the mixture user-delegate authentication sub-license ASL with H5, to encrypt a response message at the at least one service server; and
   e. Using the HK, generated by the token of the delegate, to decrypt the received encrypted response message at the at least one client device.

15. Software stored on a non-transitory computer readable medium for causing a network system to perform functions to authenticate a user over the network system, wherein the network system has at least one service server, at least one client device and a token provider communicable with one another through the internet, wherein the user has an account established with an account identifier (UserID) in the at least one service server, a hardware token assigned by the token provider, and an owner code (OC) known only by the user and the token provider, wherein the at least one service server has a uniquely global identifier (SC) and an authentication license (AL) associated with the identification information of the at least one service server, the hardware token and the user, wherein the AL is provided by the token provider and stored in the at least one service server, wherein the SC and the OC are stored in a database of the token provider, and wherein the hardware token is communicable with the at least one client device and the database of the token provider, the functions comprising:
    a. entering the SC and the OC into the token by the user;
    b. generating a first exposed key (EK) and a first hidden key (HK) by the token, wherein each of the EK and the HK is associated with at least the SC and the OC, and a time code (TC) and a noise code (NC) of the token, wherein the TC is the current time of the token when the EK and the HK are generated, and the NC is a built-in secret string of the token;
    c. initializing a user login session of the at least one service server from the at least one client device by the user to enter the UserID and the generated EK thereinto, wherein the UserID and the generated EK are transmitted to the at least one service server through the internet;
    d. computing a second exposed key (CEK) and a second hidden key (CHK) by the at least one service server based on the AL provided by the token provider;
    e. authenticating the user by at the at least one service server when the CEK is same as the EK;
    f. sending a response message to the at least one client device by at the at least one service server, wherein the response message is encrypted with the CHK; and
    g. decrypting the response message received from the at least one service server at the at least one client device by the HK.

16. A method for authenticating a user to render a piece of protected digital content stored in a compliant device in an offline system with a content publisher, a compliant device, a service server and a token provider, wherein the compliant device has a core content token (CCT) installed therein, wherein the service server has a uniquely global identifier (SC) and are adapted for providing a content license (CL) of the piece of protected digital content, wherein the user has an account established with an account identifier (UserID) in the service server, a hardware token assigned by the token provider, and an owner code (OC) known only by the user and the token provider, wherein the SC and the OC are stored in a database of the token provider, comprising the steps of:
    a. generating two pairs of RSA public and private keys (PU_FOR_PUBLISHER, PR_FOR_PUBLISHER) and (PU_FOR_TOKEN, PR_FOR_TOKEN) by a consortium joined by the content publisher, the compliant device manufacture, and the token provider such that
        (i). the token provider is assigned the public key PU_FOR_TOKEN;
        (ii). the content publishers is assigned with the same public key PU_FOR_PUBLISHER; and
        (iii). private keys PR_FOR_PUBLISHER and PR_FOR_TOKEN are stored in the core content token CCT installed in the compliant device,
    b. packaging the digital content as a piece of the protected digital content by the content publisher;
    c. requesting the content license (CL) of the protected digital content by the user from the service server;
    d. providing a license exposed key (LEK) by the user with the hardware token to the compliant device; and
    e. authenticating the offline user by the compliant device for rendering the protected digital content based on the received LEK and the content license,
wherein the CCT is built by the consortium.

17. The method of claim 16, wherein the step of packaging the digital content by the publisher comprises the steps of:
    a. generating a globally unique identifier, CONTENT_ID, for each piece of digital content;
    b. encrypting the digital content by a symmetric encryption algorithm based on a random encryption key, CONTENT_KEY, to form a protected digital content, PROTECTED_CONTENT; and
    c. distributing freely the protected digital content PROTECTED_CONTENT.

18. The method of claim 16, wherein the step of requesting the content license (CL) of the protected digital content by the user from the service server comprises the steps of:
    a. logging in the service server by the user with the user identifier UserID and an exposed key EK generated by the token;
    b. providing the desired CONTENT_ID and the required digital right by the user to the service server;
    c. sending the collected data and request from the service server to the token provider;
    d. generating a random dynamic license key DLK, with the same length of LNC of the user by the token provider;
    e. computing a supplement license key SLK, by applying exclusive OR operation on the DLK and the LNC, by the token provider so that LNC is revealable by using exclusive OR on the DLK and the SLK;
    f. sending the CONTENT_ID, the DLK, and the digital rights information from the token provider to a corresponding digital content publisher;
    g. generating a random dynamic content key DCK, with the same length of CONTENT_KEY associated with the CONTENT_ID, by the digital content publisher;
    h. computing a supplement content key SCK, by applying exclusive OR operation on the DCK and the CONTENT_KEY, by the digital content publisher so that CONTENT_KEY is revealable by using exclusive OR on the DCK and the SCK;
    i. encrypting the CONTENT_ID, the SCK, the DLK and the digital rights information by the digital content publisher with public key PU_FOR_PUBLISHER to form the LICENSE_BODY;
    j. sending the LICENSE_BODY and the DCK from the digital content publisher to the token provider;
    k. encrypting the CONTENT_ID, the SLK and the DCK by the token provider with public key PU_FOR_TOKEN to form the LICENSE_HEADER;
    l. packaging the LICENSE_HEADER and the LICENSE_BODY received from the token provider by the service server to form the content license CL; and
    m. sending the content license CL from the service server to the user.

19. The method of claim 16, wherein the step of providing the license exposed key LEK by the user with the hardware token comprises the step of generating the license exposed key by the hardware token with a sixth hash function H6 on a combination of the license noise code LNC and the time code TC of the hardware token.

20. The method of claim 16, wherein the hardware core content token CCT installed in the compliant device comprises:
    a. a tamper-proof and irreversible time clock having a device time code DTC;
    b. means for storing tamper-proof and non-volatile private keys PR_FOR_TOKEN, PR_FOR_PUBLISHER;
    c. means for receiving the license exposed key LEK provided by the user wired or wirelessly;

d. means for computing CONTENT_ID, CONTENT_KEY and LNC by decrypting the content license CL;
e. means for computing LEK based on LNC and a synchronous time ST; and
f. means for decrypting PROTECTED_CONTENT with key CONTENT_KEY.

21. The method of claim 20, wherein the CONTENT_KEY and the LNC are computed by the core content token CCT installed the compliant device by the steps of:
   a. decrypting the LICENSE_HEADER with the stored private key PR_FOR_TOKEN by the core content token CCT to get the CONTENT_ID, the SLK and the DCK;
   b. decrypting the LICENSE_BODY with the stored private key PR_FOR_PUBLISHER by the core content token CCT to get the CONTENT_ID, the SCK and the DLK;
   c. rejecting the rendering request by the compliant device if the CONTENT_ID decrypted from LICENSE_HEADER is substantially different from the CONTENT_ID decrypted from the LICENSE_BODY;
   d. performing exclusive OR on DCK and SCK by the core content token CCT installed in the compliant device to form the CONTENT_KEY of the content; and
   e. performing exclusive OR on the DLK and the SLK by the core content token CCT to form the LNC of the hardware token owned by the user.

22. The method of claim 21, wherein the step of authenticating the offline user by the compliant device for rendering the digital content comprises the steps of:
   a. installing the content license CL into the compliant device by the user;
   b. requesting the compliant device by the user to rendering the installed the protected digital content;
   c. verifying the CONTENT_ID by the core content token CCT installed in the compliant device based on the installed content license;
   d. providing the LEK by the user to the compliant device without entering the owner code OC and the space code SC into the hardware token;
   e. finding a synchronous time ST within the range of (CT−q, CT+q), wherein the CT is the current time of the core content CCT token, and q is a time tolerance, such that a value of hashing a combination of the LNC and the ST, using the sixth hash function H6 is same as the received LEK;
   f. using a used timestamp UT to remove the possible multiple authentications for one LEK;
   g. authenticating the user if the value of hashing a combination of the LNC and the ST, using the sixth hash function H6 is same as the received LEK;
   h. decrypting the PROTECTED_CONTENT by the core content token CCT installed in the compliant device with the CONTENT_KEY; and
   i. rendering the decrypted digital content by the compliant device based on the digital right embedded in the CL.

23. The method of claim 22, wherein the step of authenticating the offline user by the compliant device for rendering the digital content further comprises the step of rejecting the rendering request if the value of hashing a combination of the LNC and the ST, using the sixth hash function H6 is different from the received LEK.

24. The method of claim 20, wherein the step of authenticating the offline user by the compliant device for rendering the protected digital content comprises the steps of:
   a. triggering the hardware token by the user to generate the license exposed key LEK;
   b. emitting a requesting signal for rendering the protected digital content from the hardware token to the compliant device;
   c. generating a random challenge number CHALLENGE by the CCT of the compliant device;
   d. emitting a signal corresponding to the CHALLENGE from the compliant device;
   e. receiving the signal corresponding to the CHALLENGE by the hardware token;
   f. generating a challenged license exposed key CLEK=E(H(M(LNC||CHALLENGE, H(TC)))) by the hardware token, where || is a concatenation operator;
   g. receiving the CLEK by the CCT of the compliant device;
   h. finding a synchronous time ST by the CCT of the compliant device, wherein the synchronous time ST is in the time range of (CT−q, CT+q) so that CLEK=E(H(M(LNC||CHALLENGE, H(ST)))) is same as the received CLEK, wherein CT is the current time of the clock on the CCT of the compliant device, and q is a constant;
   i. authenticating the user if the received ST is within the time range of (CT−q, CT+q); and
   j. rejecting the request of rendering the protected digital content if no such a ST is found.

25. Software stored on a non-transitory computer readable medium for causing an offline system to perform functions to authenticate a user to render a piece of protected digital content stored in a compliant device in the offline system with a content publisher, a compliant device, a service server and a token provider, wherein the compliant device has a core content token (CCT) installed therein, wherein the service server has a uniquely global identifier (SC) and are adapted for providing a content license (CL) of the piece of protected digital content, wherein the user has an account established with an account identifier (UserID) in the service server, a hardware token assigned by the token provider, and an owner code (OC) known only by the user and the token provider, wherein the SC and the OC are stored in a database of the token provider, the function comprising:
   a. generating two pairs of RSA public and private keys (PU_FOR_PUBLISHER, PR_FOR_PUBLISHER) and (PU_FOR_TOKEN, PR_FOR_TOKEN) by a consortium joined by the content publisher, the compliant device manufacture, and the token provider such that
      (i). the token provider is assigned the public key PU_FOR_TOKEN;
      (ii). the content publishers is assigned with the same public key PU_FOR_PUBLISHER; and
      (iii). private keys PR_FOR_PUBLISHER and PR_FOR_TOKEN are stored in the core content token (CCT) installed in the compliant device,
   b. packaging the digital content as a piece of the protected digital content by the content publisher;
   c. requesting the content license (CL) of the protected digital content by the user from the service server;
   d. providing a license exposed key (LEK) by the user with the hardware token to the compliant device; and
   e. authenticating the offline user by the compliant device for rendering the protected digital content based on the received LEK and the content license.

* * * * *